United States Patent
Inoue et al.

(10) Patent No.: US 10,427,388 B2
(45) Date of Patent: Oct. 1, 2019

(54) EMULSION COMPOSITION AND PRODUCTION METHOD THEREOF, AND LAMINATE AND PRODUCTION METHOD THEREOF

(71) Applicant: ARAKAWA CHEMICAL INDUSTRIES, LTD., Osaka-shi (JP)

(72) Inventors: Akihisa Inoue, Tokyo (JP); Taichi Maruyama, Tokyo (JP); Shinji Tonsho, Tokyo (JP); Naoyuki Makiuchi, Tokyo (JP); Naoyuki Kawashima, Tokyo (JP)

(73) Assignee: ARAKAWA CHEMICAL INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 15/549,761

(22) PCT Filed: Sep. 1, 2016

(86) PCT No.: PCT/JP2016/075732
§ 371 (c)(1),
(2) Date: Aug. 9, 2017

(87) PCT Pub. No.: WO2017/051683
PCT Pub. Date: Mar. 30, 2017

(65) Prior Publication Data
US 2018/0043667 A1    Feb. 15, 2018

(30) Foreign Application Priority Data

Sep. 24, 2015    (JP) ................................. 2015-187377

(51) Int. Cl.
| | | |
|---|---|---|
| *C08F 2/44* | (2006.01) | |
| *B32B 27/30* | (2006.01) | |
| *B05D 7/04* | (2006.01) | |
| *B05D 7/24* | (2006.01) | |
| *B29C 55/02* | (2006.01) | |
| *C08F 4/04* | (2006.01) | |
| *C08F 22/16* | (2006.01) | |
| *C08F 2/26* | (2006.01) | |
| *C08F 2/50* | (2006.01) | |

(52) U.S. Cl.
CPC ............... *B32B 27/30* (2013.01); *B05D 7/04* (2013.01); *B05D 7/24* (2013.01); *B29C 55/02* (2013.01); *C08F 2/26* (2013.01); *C08F 2/44* (2013.01); *C08F 2/50* (2013.01); *C08F 4/04* (2013.01); *C08F 22/16* (2013.01)

(58) Field of Classification Search
None
See application file for complete search history.

(56) References Cited

U.S. PATENT DOCUMENTS

| | | | | |
|---|---|---|---|---|
| 6,028,135 A | * | 2/2000 | Keller | C08F 291/00 524/458 |
| 6,103,786 A | * | 8/2000 | Hoch | C08J 3/07 516/53 |
| 6,160,049 A | * | 12/2000 | Mathauer | C08F 2/24 524/804 |
| 2003/0022086 A1 | * | 1/2003 | Iga | G03G 9/08 430/108.1 |
| 2004/0171718 A1 | * | 9/2004 | Nakamura | C09D 11/30 523/160 |
| 2005/0014883 A1 | * | 1/2005 | Blankenship | C08F 2/001 524/458 |
| 2012/0019766 A1 | * | 1/2012 | Oki | G02B 5/0816 349/193 |
| 2015/0175724 A1 | * | 6/2015 | Klostermann | C08F 120/10 514/772.3 |

FOREIGN PATENT DOCUMENTS

| | | |
|---|---|---|
| JP | 2001-233928 A | 8/2001 |
| JP | 2002-12651 A | 1/2002 |
| JP | 2008-297271 A | 12/2008 |
| JP | 2013-18921 A | 1/2013 |
| JP | 2013-237835 A | 11/2013 |

(Continued)

OTHER PUBLICATIONS

International Search Report dated Dec. 6, 2016 in PCT/JP2016/075732 filed Sep. 1, 2016.

*Primary Examiner* — Robert S Loewe
(74) *Attorney, Agent, or Firm* — Oblon, McClelland, Maier & Neustadt, L.L.P.

(57) ABSTRACT

An emulsion composition according to the present invention includes: a polymerizable compound comprising two or more (meth)acryloyl groups; a surfactant; and a dispersion medium including water as a principal component, in which an oil droplet diameter $D_{90}$ corresponding to a diameter at cumulative 90% by volume in the oil droplet size distribution of oil droplets comprising the polymerizable compound and the surfactant, measured according to a laser diffraction and scattering measurement process is less than 1.8 µm. A maximum oil droplet diameter $D_{max}$ of the oil droplets, measured according to the laser diffraction and scattering measurement process is preferably less than 4.0 µm. A content of the polymerizable compound in the composition with respect to 100 parts by mass of a total of components other than the dispersion medium is preferably no less than 40 parts by mass. The oil droplets may further comprise an inorganic particle.

16 Claims, No Drawings

(56) References Cited

FOREIGN PATENT DOCUMENTS

| | | |
|---|---|---|
| JP | 2014-806 A | 1/2014 |
| JP | 2014-52493 A | 3/2014 |
| JP | 2014-133807 A | 7/2014 |
| JP | 2014-162889 A | 9/2014 |
| JP | 2014-199320 A | 10/2014 |
| JP | 2015-54461 A | 3/2015 |
| JP | 2015-71741 A | 4/2015 |
| JP | 2015-124291 A | 7/2015 |
| JP | 2015-146243 A | 8/2015 |
| JP | 2015-147828 A | 8/2015 |
| JP | 2015-147952 A | 8/2015 |

\* cited by examiner

EMULSION COMPOSITION AND PRODUCTION METHOD THEREOF, AND LAMINATE AND PRODUCTION METHOD THEREOF

TECHNICAL FIELD

The present invention relates to an emulsion composition and a production method of the emulsion composition, and to a laminate and a production method of the laminate.

BACKGROUND ART

Substrates containing a resin as a principal component have been employed as substrate films for a wide range of applications since such substrates readily enhance a variety of characteristics such as dimension accuracy, mechanical strength, heat resistance, transparency, and electrical insulation properties. When applied to, for example, a surface protective film for a flat panel display device, a protective film for a solar cell, and the like, such substrates are each typically employed in such a way that an adherend such as a hard coat layer containing a photocurable resin, a thermosetting resin, a thermoplastic resin and/or the like, as a principal component, is overlaid on a surface of the substrate, for the purpose of improving weather resistance, scuff resistance, and the like.

However, the principal component of the hard coat layer is often low in adhesiveness to the substrate. Therefore, when forming the hard coat layer, it is desired to subject to a surface treatment beforehand the substrate or a resin film that is a substrate-forming material. A procedure of the surface treatment has been known which comprises applying onto a surface of the substrate, etc. an emulsion composition containing, for example, water as a dispersion medium, and a polyester dispersed in the water to form a coating film as an easily adhesive layer (see Japanese Unexamined Patent Application, Publication No. 2015-124291). The above-identified publication describes that the improvement of the adhesiveness between the substrate and the hard coat layer is enabled by forming the coating film as the easily adhesive layer on the surface of the substrate, etc. and then forming the hard coat layer on this coating film.

However, due to containing a non-cross-linked resin as a principal component and having insufficient film compactness, the coating film formed from the emulsion composition is likely to permit a component having a relatively low molecular weight (relatively low molecular component) such as an oligomer and an additive contained in the substrate to permeate. Therefore, a laminate in which the substrate and the hard coat layer are laminated with the interposition of the coating film may be accompanied by permeation of the relatively low molecular component through the coating film during use and in turn bleeding out to an interface between the hard coat layer and the coating film, thereby leading to a decrease in adhesiveness between the substrate and the hard coat layer and to a deterioration of appearance thereof.

PRIOR ART DOCUMENTS

Patent Documents

Patent Document 1: Japanese Unexamined Patent Application, Publication No. 2015-124291

SUMMARY OF THE INVENTION

Problems to be Solved by the Invention

The present invention was made in view of the foregoing circumstances, and an object of the present invention is to provide an emulsion composition that is capable of forming a coating film having superior bleed-out preventing properties and a production method of the emulsion composition, and a laminate including the emulsion composition and a production method of the laminate.

Means for Solving the Problems

According to an aspect of the invention made for solving the aforementioned problems, an emulsion composition comprises: a polymerizable compound comprising two or more (meth)acryloyl groups (hereinafter, may be also referred to as "polymerizable compound (A)"); a surfactant (hereinafter, may be also referred to as "surfactant (B)"); and a dispersion medium comprising water as a principal component (hereinafter, may be also referred to as "dispersion medium (C)"), wherein the oil droplet diameter $D_{90}$ corresponding to a diameter at cumulative 90% by volume in the oil droplet size distribution of oil droplets comprising the polymerizable compound and the surfactant, measured according to a laser diffraction and scattering measurement process is less than 1.8 μm.

According to another aspect of the invention, a production method of an emulsion composition comprises: mixing a dispersion medium comprising water as a principal component, a polymerizable compound comprising two or more (meth)acryloyl groups, and a surfactant; and applying a stress to a mixture obtained by the mixing, wherein an oil droplet diameter $D_{90}$ corresponding to a diameter at cumulative 90% by volume in the oil droplet size distribution of oil droplets obtained by the applying, measured according to a laser diffraction and scattering measurement process is less than 1.8 μm.

According to still another aspect of the invention, a laminate comprises: a substrate; and a coating film that is overlaid on at least one face of the substrate, wherein the coating film is formed from the emulsion composition of the aspect of the present invention.

According to yet another aspect of the invention, a production method of a laminate comprises: applying the emulsion composition of the aspect of the present invention on at least one face of a substrate or a resin film that is a substrate-forming material; and heating an applied film obtained by the applying.

The term "principal component" as referred to herein means a component having the highest content, and refers to, for example, a component having a content of no less than 40 mass %. The term "oil droplet size distribution" as referred to herein means the distribution of sizes of all dispersoids (particles) that are measured according to a laser diffraction and scattering measurement process, which include not only liquid colloid particles, but also solid colloid particles such as inorganic particles.

Effects of the Invention

According to the emulsion composition of the present invention, the formation of a coating film having superior bleed-out preventing properties is enabled. According to the production method of the emulsion composition of the present invention, easy and reliable production of the emulsion composition is enabled. According to the laminate of the present invention, appearance thereof is unlikely to deteriorate, and adhesiveness to an adherend is unlikely to decrease. According to the production method of the laminate of the present invention, easy and reliable production of the laminate is enabled.

DESCRIPTION OF EMBODIMENTS

Emulsion Composition

The emulsion composition contains (A) a polymerizable compound, (B) a surfactant and (C) a dispersion medium, and the oil droplet diameter $D_{90}$ corresponding to a diameter at cumulative 90% by volume in the oil droplet size distribution of the oil droplets containing the polymerizable compound (A) and the surfactant (B), measured according to the laser diffraction and scattering measurement process is less than 1.8 μm. The emulsion composition is used through applying on, for example, at least one face of a resin film that is a substrate-forming material.

By virtue of involving the aforementioned features, the emulsion composition enables a coating film having superior bleed-out preventing properties to be formed. Although not necessarily clarified, the reason for achieving the effects described above due to involving the features is inferred as in the following, for example. Specifically, the emulsion composition contains oil droplets containing the polymerizable compound (A) and the surfactant (B), and the oil droplet diameter $D_{90}$ corresponding to a diameter at cumulative 90% by volume of the oil droplets is less than 1.8 μm. In other words, most of the oil droplets contained in the emulsion composition are relatively small. Therefore, the emulsion composition enables formation of an applied film containing the polymerizable compound (A) and having superior evenness, and in turn, formation of a coating film that has a superior compactness and is capable of inhibiting permeation of a relatively low molecular component such as a plasticizer, a coloring material, and an oligomer. Therefore, the coating film overlaid on the one face of the substrate, etc., is considered to inhibit permeation of the relatively low molecular component contained in the substrate, etc., and to consequently enable prevention of the bleed-out of the relatively low molecular component onto an opposite face to the substrate, etc.

The lower limit of the solid content concentration of the emulsion composition is preferably 0.1% by mass, more preferably 1% by mass, and still more preferably 5% by mass. On the other hand, the upper limit of the solid content concentration of the emulsion composition is preferably 40% by mass, more preferably 30% by mass, and still more preferably 20% by mass. When the solid content concentration of the emulsion composition falls within the above range, the enhancement of application properties is enabled. The term "solid content" as referred to herein means components other than the dispersion medium (C) of the emulsion composition.

The lower limit of the viscosity of the emulsion composition measured by an E-type viscometer at a temperature of 25° C. is preferably 1 mPa·s and more preferably 1.5 mPa·s. On the other hand, the upper limit of the viscosity of the emulsion composition is preferably 200 mPa·s, and more preferably 100 mPa·s. When the viscosity of the emulsion composition falls within the above range, the enhancement of application properties is enabled.

The upper limit of the total content of alkali metal ions in the emulsion composition is preferably 1,000 ppm, more preferably 500 ppm, still more preferably 300 ppm, and particularly preferably 100 ppm. When the total content of the alkali metal ions in the emulsion composition falls within the above range, the enhancement of application properties is enabled. Furthermore, the enhancement of insulation properties is enabled in a case of employing a cured film formed from the emulsion composition as a substrate for forming an electrode, for example.

In the following, each component of the emulsion composition will be described in detail. It is to be noted that each component exemplified below, unless otherwise specified particularly, may be used either alone of one type, or in combination of two or more types thereof.

Polymerizable Compound (A)

The polymerizable compound (A) contains two or more (meth)acryloyl groups. The polymerizable compound (A) spontaneously polymerizes upon heating, and a resulting polymer of which serves as a base material for a coating film formed from the emulsion composition. At least a part of the polymerizable compound (A) contained in the emulsion composition, together with the surfactant (B), forms oil droplets.

The lower limit of the number of (meth)acryloyl groups contained in the polymerizable compound (A) is 2, and preferably 3. On the other hand, the upper limit of the number of the (meth)acryloyl groups contained in the polymerizable compound (A) is preferably 10, more preferably 8, and still more preferably 6.

The polymerizable compound (A) having two (meth)acryloyl groups is exemplified by ethylene glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth)acrylate, and the like.

The polymerizable compound (A) having three (meth)acryloyl groups is exemplified by trimethylolpropane tri(meth)acrylate, pentaerythritol tri(meth)acrylate, glycerin tri(meth)acrylate, tris(2-hydroxyethyl)isocyanurate tri(meth)acrylate, and the like.

The polymerizable compound (A) having four (meth)acryloyl groups is exemplified by: pentaerythritol tetra(meth)acrylate, dipentaerythritol penta(meth)acrylate, dipentaerythritol hexa(meth)acrylate, and ditrimethylolpropane tetra(meth)acrylate; oligoester (meth)acrylates, oligoether (meth)acrylates and oligoepoxy(meth)acrylates each having four or more (meth)acryloyl groups; poly(meth)acrylates of ethylene oxide or propylene oxide adducts to hydroxyl groups of dipentaerythritol, etc.; and the like.

In addition to the aforementioned compounds, a polyfunctional urethane acrylate having a urethane group and two or more (meth)acryloyl groups may be employed as the polymerizable compound (A).

The structure between the urethane groups in the polyfunctional urethane acrylate is preferably a hydrocarbon structure, more preferably an alicyclic structure, and still more preferably a cyclohexane structure, an isophorone structure and a norbornane structure. When the structure between the urethane groups in the polyfunctional urethane acrylate is any one of the aforementioned structures, the further enhancement of the bleed-out preventing properties of the coating film formed from the emulsion composition is enabled. Such a polyfunctional urethane acrylate is exemplified by a reaction product of a polyacrylate of dipentaerythritol such as NK Ester A-9570W available from Shin-Nakamura Chemical Co., Ltd., or Alonix M-402 available from Toa Gosei Co., Ltd. with a hydrocarbon structure-containing polyisocyanate such as HDI (hexamethylene diisocyanate) available from Tosoh Corporation, TAKENATE (1,3-bis(isocyanatomethyl)cyclohexane) available from Mitsui Chemicals, Inc., Desmodur I (isophorone diisocyanate) available from Sumika Bayer Urethane Co., Ltd., Cosmonate NBDI (2,5-bis(isocyanatomethyl)bicyclo[2.2.1]heptane) available from Mitsui Chemicals, Inc., or VESTANAT T1890/100 (isocyanurate form of isophorone diisocyanate) available from Evonik Industries, and the like.

In addition, examples of a commercially available product of the polyfunctional urethane acrylate include UA-W2A (bifunctional urethane acrylate) and U-6LPA (hexafunctional urethane acrylate) available from Shin-Nakamura Chemical Co., Ltd. and KAYARAD DPHA-40H (decafunctional urethane acrylate) available from Nippon Kayaku Co., Ltd.

The lower limit of the acrylic equivalent of the polymerizable compound (A) is preferably 50 g/eq, more preferably 70 g/eq, and still more preferably 90 g/eq. On the other hand, the upper limit of the acrylic equivalent of the polymerizable compound (A) is preferably 2,000 g/eq, more preferably 1,000 g/eq, still more preferably 300 g/eq, and particularly preferably 140 g/eq. When the acrylic equivalent of the polymerizable compound (A) falls within the above range, the enhancement of abrasion resistance and hardness of the coating film formed from the emulsion composition is enabled. The term "acrylic equivalent" as referred to herein means a value obtained by dividing the molecular weight of a compound by the number of (meth)acryloyl groups contained in the compound, and indicates a molecular weight per mol of the (meth)acryloyl groups.

The polymerizable compound (A) particularly preferably has an acrylic equivalent of no greater than 1,000 g/eq. By virtue of the emulsion composition containing the polymerizable compound (A) having the acrylic equivalent of 1,000 g/eq, the remarkable enhancement of hardness of the formed coating film is enabled. The lower limit of the ratio of the polymerizable compound (A) having the acrylic equivalent of no greater than 1,000 g/eq with respect to the total amount of the polymerizable compound (A) contained in the emulsion composition is preferably 50% by mass.

The lower limit of the molecular weight of the polymerizable compound (A) is preferably 200, more preferably 500, still more preferably 1,000, particularly preferably 2,000, and still particularly preferably 2,500. On the other hand, the upper limit of the molecular weight of the polymerizable compound (A) is preferably 5,000, more preferably 4,000, still more preferably 3,700, and particularly preferably 3,500. When the molecular weight of the polymerizable compound (A) falls within the above range, the further enhancement of the bleed-out preventing properties of the coating film formed from the emulsion composition is enabled.

In addition to the above illustrative examples, the polymerizable compound (A) may also be exemplified by polymerizable compounds having two or more (meth)acryloyl groups disclosed in Japanese Unexamined Patent Application, Publication Nos. 2001-233928, 2002-012651, 2008-297271, 2015-054461, 2015-146243, 2015-147828 and 2015-147952, and the like.

Of these, the polymerizable compound (A) is preferably dipentaerythritol hexaacrylate, dipentaerythritol pentaacrylate, dipentaerythritol tetraacrylate, dipentaerythritol triacrylate, pentaerythritol tetraacrylate, pentaerythritol triacrylate, a hexaacrylate of an ethylene oxide adduct of dipentaerythritol, a modified hexaacrylate, a polyfunctional urethane acrylate containing a urethane group and two or more (meth)acryloyl groups, polyethylene glycol diacrylate, polypropylene glycol diacrylate and polytetramethylene glycol diacrylate, and more preferably dipentaerythritol hexaacrylate, dipentaerythritol pentaacrylate and the polyfunctional urethane acrylate.

The lower limit of the content of the polymerizable compound (A) in the emulsion composition with respect to 100 parts by mass of the total of the components other than the dispersion medium (C) is preferably 40 parts by mass, more preferably 45 parts by mass, still more preferably 50 parts by mass, and particularly preferably 55 parts by mass. On the other hand, the upper limit of the content of the polymerizable compound (A) with respect to 100 parts by mass of the total of the components other than the dispersion medium (C) is preferably 99 parts by mass and more preferably 97 parts by mass. When the content of the polymerizable compound (A) falls within the above range, the further enhancement of the bleed-out preventing properties of the coating film formed from the emulsion composition is enabled.

The lower limit of the content of the polymerizable compound (A) having three or more (meth)acryloyl groups in the emulsion composition with respect to 100 parts by mass of the total of the components other than the dispersion medium (C) is preferably 30 parts by mass, more preferably 35 parts by mass, still more preferably 40 parts by mass, and particularly preferably 45 parts by mass. On the other hand, the upper limit of the content of the polymerizable compound (A) having three or more (meth)acryloyl groups with respect to 100 parts by mass of the total of the components other than the dispersion medium (C) is preferably 99 parts by mass and more preferably 97 parts by mass. When the content of the polymerizable compound (A) having three or more (meth)acryloyl groups falls within the above range, the further enhancement of the bleed-out preventing properties of the coating film formed from the emulsion composition is enabled.

Surfactant (B)

At least a part of the surfactant (B), together with the polymerizable compound (A), forms oil droplets. The surfactant (B) may be exemplified by a compound represented by the following formula (1), for example:

(1)

$$X-O-(R^1O)_n-R^2$$

In the above formula (1), X represents a monovalent group that includes an aromatic ring, an ethylenenic double bond or a combination thereof; $R^1$ represents an alkylene group having 2 to 4 carbon atoms; n is an integer of 5 to 150, wherein a plurality of $R^1$s may be identical or different; and $R^2$ represents a hydrogen atom, $-PO(OM)_2$, $-SO_3M$ or a monovalent ethylenic double bond-containing group, wherein M each independently represents a hydrogen atom, an ammonium group or a metal atom.

The aromatic ring included in the monovalent group represented by X is exemplified by a benzene ring, a naphthalene ring, an anthracene ring, a phenanthrene cycle, and the like. It is to be noted that, when X includes an aromatic ring, the aromatic ring may be either unsubstituted or substituted with an alkyl group, an aryl group, a combination thereof or the like.

The monovalent group represented by X is exemplified by a group represented by the following formula (2), a vinyl group, an allyl group, an alkenyl group such as a 3-pentenyl group, a (meth)acryloyl group, an allyl ether group, and the like. Of these, X is preferably the group represented by the following formula (2).

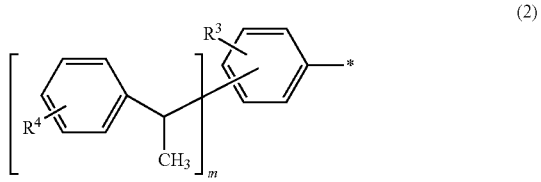

(2)

In the above formula (2), $R^3$ and $R^4$ each independently represent a hydrogen atom or an alkyl group; m is an integer of 1 to 3, wherein when m is 2 or 3, a plurality of $R^4$s may be identical or different; and * denotes a site that binds to the oxygen atom in the above formula (1)

The alkyl group which may be represented by each of $R^3$ and $R^4$ is exemplified by an alkyl group having 1 to 3 carbon atoms such as a methyl group, an ethyl group, and a propyl group.

Furthermore, m is preferably 1 or 2.

Examples of the alkylene group having 2 to 4 carbon atoms represented by $R^1$ include an ethylene group, an n-propylene group, an i-propylene group, an n-butylene group, an i-butylene group, and the like.

The monovalent ethylenic double bond-containing group which may be represented by $R^2$ is exemplified by a vinyl group, an allyl group, an alkenyl group such as a 3-pentenyl group, a (meth)acryloyl group, an allyl ether group, an ionic group formed from: a cation such as an ammonium ion having any of these groups as a substituent; and an anion group such as $-SO_3^-$, and the like.

The metal ion represented by M is exemplified by ions of alkali metals such as sodium, potassium and lithium.

Not only the compound represented by the above formula (1), a nonionic surfactant, an anionic surfactant, and/or the like may be employed as the surfactant (B).

The nonionic surfactant is exemplified by an alkyl ester of polyethylene glycol or polyalkylene glycol, a fatty acid ester, a sorbitan fatty acid ester, a sorbitol fatty acid ester, an alkyl ether, an alkylphenyl ether, and the like.

The anionic surfactant is exemplified by: rosin acid salts such as potassium rosinate and sodium rosinate; sodium salts or potassium salts of a fatty acid such as potassium oleate, potassium laurate, sodium laurate, sodium stearate and potassium stearate; sulfuric acid ester salts of an aliphatic alcohol such as sodium lauryl sulfate; alkyl aryl sulfonic acid salts such as sodium dodecylbenzenesulfonate, and the like.

A reactive surfactant may be employed as the surfactant (B). The reactive surfactant is exemplified by, of the compounds represented by the above formula (1), a compound in which the monovalent group represented by X has an ethylenic double bond, a compound in which $R^2$ represents a monovalent ethylenic double bond-containing group, a compound in which the monovalent group represented by X has an ethylenic double bond and $R^2$ represents a monovalent ethylenic double bond-containing group, and the like. Commercially available products of the reactive surfactant are exemplified by LATEMUL S-180A, LATEMUL PD-104, LATEMUL PD-105, LATEMUL PD-420, and LATEMUL PD-430 (each available from Kao Corporation), Eleminol JS-2 (available from Sanyo Chemical Industries, Ltd.), AQUARON KH-10, AQUARON BC-20, AQUARON RN-20, AQUARON RN-30, and AQUARON RN-50 (each available from DKS Co. Ltd.), ADEKA REASOAP SE-10N and ADEKA REASOAP SR-10N (each available from ADEKA Corporation), Antox MS-60 (available from Nippon Nyukazai Co., Ltd.), Surfmer FP-120 (Toho Chemical Industry Co., Ltd.), and the like.

As the surfactant (B), the compound represented by the above formula (1) is preferred, and a polyoxyethylene polycyclic phenyl ether sulfuric acid ester salt is more preferred.

The lower limit of the content of the surfactant (B) in the emulsion composition with respect to 100 parts by mass of the total of the components other than the dispersion medium (C) is preferably 0.01 parts by mass, more preferably 0.1 parts by mass, still more preferably 0.2 parts by mass, and particularly preferably 0.5 parts by mass. On the other hand, the upper limit of the content of the surfactant (B) with respect to 100 parts by mass of the total of the components other than the dispersion medium (C) is preferably 30 parts by mass, more preferably 20 parts by mass, and still more preferably 10 parts by mass. When the content of the surfactant (B) falls within the above range, enhancements of dispersibility of the polymerizable compound (A) and hardness of the coating film formed from the emulsion composition are enabled.

Oil Droplets

As described above, the emulsion composition contains the polymerizable compound (A) and the surfactant (B), at least partially in the form of oil droplets. The oil droplets preferably contain the compound represented by the above formula (1) as the surfactant (B). Furthermore, the oil droplets preferably contain (D) at least one inorganic particle.

The oil droplet diameter $D_{90}$ corresponding to a diameter at cumulative 90% by volume in the oil droplet size distribution of the oil droplets, measured according to the laser diffraction and scattering measurement process is less than 1.8 μm. The upper limit of the oil droplet diameter $D_{90}$ is preferably 1.7 μm, more preferably 1.6 μm, still more preferably 1.55 μm, and particularly preferably 1.50 μm. On the other hand, the lower limit of the oil droplet diameter $D_{90}$ is not particularly limited, and for example 0.2 μm. When the oil droplet diameter $D_{90}$ falls within the above range, the further enhancement of the compactness of the coating film formed from the emulsion composition is enabled, thereby consequently enabling the bleed-out preventing properties to be further enhanced.

The maximum oil droplet diameter $D_{max}$ of the oil droplets, measured according to the laser diffraction and scattering measurement process is preferably less than 4.0 μm. The upper limit of the maximum oil droplet diameter $D_{max}$ is more preferably 3.9 μm, still more preferably 3.8 μm, particularly preferably, 3.7 μm, and still particularly preferably 3.6 μm. On the other hand, the lower limit of the maximum oil droplet diameter $D_{max}$ is not particularly limited, and for example 0.5 μm. When the oil droplet diameter $D_{max}$ falls within the above range, i.e., when a comparatively large oil droplet is not present, the further enhancement of the compactness of the coating film formed from the emulsion composition is enabled, thereby consequently enabling the bleed-out preventing properties to be further enhanced. The term "maximum oil droplet diameter $D_{max}$" as referred to herein means a maximum value of an oil droplet diameter detected by a laser diffraction and scattering particle size distribution measurement apparatus.

The lower limit of the oil droplet diameter $D_{50}$ corresponding to a diameter at cumulative 50% by volume in the oil droplet size distribution, measured according to the laser diffraction and scattering measurement process of the oil droplets is preferably 0.10 µm, more preferably 0.15 µm, and still more preferably 0.20 µm. On the other hand, the upper limit of the oil droplet diameter $D_{50}$ is preferably 1.2 µm, more preferably 1.0 µm, and still more preferably 0.8 µm. When the oil droplet diameter $D_{50}$ falls within the above range, the further enhancement of the compactness of the coating film formed from the emulsion composition is enabled, thereby consequently enabling the bleed-out preventing properties to be further enhanced.

Dispersion Medium (C)

The dispersion medium (C) contains water as a principal component. The dispersion medium (C) may contain only water, or may be a mixed dispersion medium containing water and an organic solvent. In light of an environmental burden and the like, the dispersion medium (C) preferably contains only water.

The organic solvent is not particularly limited as long as it is a water-soluble organic medium, and is exemplified by an alcohol, an ether, and the like. Examples of the alcohol include methanol, ethanol, n-propyl alcohol, i-propyl alcohol, n-butyl alcohol, sec-butyl alcohol, t-butyl alcohol, isobutyl alcohol, n-hexyl alcohol, n-octyl alcohol, ethylene glycol, propylene glycol, diethylene glycol, triethylene glycol, diacetone alcohol, and the like. Examples of the ether include ethylene glycol monobutyl ether, propylene glycol monomethyl ether, propylene glycol monoethyl ether, and the like.

When the dispersion medium (C) contains the organic solvent, the upper limit of the content of the organic solvent is 10% by mass, for example.

Optional Components

The emulsion composition may further contain, as optional components, the inorganic particles (D), (E) a polyester, (F) a crosslinking agent, (G) a polymerization initiator, and/or (H) a levelling agent. Furthermore, the emulsion composition may further contain other components such as a polymerization inhibitor, an organic particle, a defoaming agent, an antiseptic agent, an antioxidant, a thickening agent, a plasticizer, a UV absorbent, and a coloring material.

Inorganic Particles (D)

The inorganic particles (D) enhance the storage stability of the emulsion composition and the hardness of the coating film to be formed. The inorganic particles (D) are contained in the emulsion composition as a dispersoid. Therefore, in the measurement of the oil droplet size distribution according to the laser diffraction and scattering measurement process, the particle diameters of the inorganic particles (D) are also measured. At least a part of the inorganic particles (D) is preferably included in the oil droplets.

The principal component of the inorganic particles (D) is exemplified by silicon oxide, aluminum oxide, zirconium oxide, titanium oxide, zinc oxide, germanium oxide, indium oxide, tin oxide, antimony oxide, cerium oxide, and the like. The principal component of the inorganic particles (D) is preferably silicon oxide, aluminum oxide, zirconium oxide, titanium oxide and a combination thereof, and more preferably silicon oxide. It is to be noted that the inorganic particles (D) may be subjected to a surface treatment with a compound that has an alkoxy group, a carboxy group, a (meth)acryloyl group, an epoxy group, and/or the like. The compound is preferably a silane compound having a (meth) acryloyl group, and more preferably methacryloxypropyltrimethoxysilane. As the inorganic particles (D), particles containing silicon oxide as a principal component having been subjected to a surface treatment with methacryloxypropyltrimethoxysilane are particularly preferred. In such a case, the acrylic equivalent of the inorganic particles (D) is not particularly limited and, for example, no less than 3,000 g/eq and no greater than 8,000 g/eq.

The lower limit of the volume average particle diameter of the inorganic particles (D) is preferably 1 nm, more preferably 5 nm, still more preferably 15 nm, and particularly preferably 20 nm. On the other hand, the upper limit of volume average particle diameter of the inorganic particles (D) is preferably 2,000 nm, more preferably 500 nm, still more preferably 100 nm, and particularly preferably 50 nm. When the volume average particle diameter of the inorganic particles (D) falls within the above range, the further enhancement of the storage stability of the emulsion composition and the hardness of the formed coating film is enabled. Furthermore, the enhancement of the transparency of the coating film to be formed is also enabled. The term "volume average particle diameter of the inorganic particles (D)" as referred to herein means a primary particle diameter measured by a dynamic light scattering particle size distribution measurement apparatus.

When the emulsion composition contains the inorganic particles (D), the lower limit of the content of the inorganic particles (D) in the emulsion composition with respect to 100 parts by mass of the total of the components other than the dispersion medium (C) is preferably 1 part by mass, more preferably 10 parts by mass, and still more preferably 25 parts by mass. On the other hand, the upper limit of the content of the inorganic particles (D) with respect to 100 parts by mass of the total of the components other than the dispersion medium (C) is preferably 99 parts by mass, more preferably 90 parts by mass, still more preferably 85 parts by mass, and particularly preferably 80 parts by mass. When the content of the inorganic particles (D) falls within the above range, the further enhancement of the storage stability of the emulsion composition and the hardness of the formed coating film is enabled while the application properties of the emulsion composition are maintained.

Polyester (E)

The polyester (E) enhances the adhesiveness between the coating film formed from the emulsion composition, and the substrate and an adherend. The polyester (E) is contained in the emulsion composition as a dispersoid. Therefore, the particle diameter of the polyester (E) is measured in the measurement of an oil droplet size distribution according to the laser diffraction and scattering measurement process. The polyester (E) is exemplified by a condensate of a polybasic acid and a polyhydric alcohol, and the like. Examples of the polybasic acid include phthalic anhydride, isophthalic acid, terephthalic acid, adipic acid, succinic anhydride, and the like. Examples of the polyhydric alcohol include ethylene glycol, propylene glycol, 1,3-butylene glycol, 1,6-hexanediol, polyethylene glycol, polypropylene glycol, and the like.

The lower limit of the polystyrene equivalent number average molecular weight (Mn) of the polyester (E) determined by gel permeation chromatography is preferably 1,000, more preferably 3,000, and still more preferably 5,000. On the other hand, the upper limit of the Mn of the polyester (E) is preferably 50,000, more preferably 30,000, and still more preferably 20,000. When the Mn of the polyester (E) falls within the above range, the further enhancement of the adhesiveness between the formed coating film, and the substrate and the adherend is enabled while the application properties of the emulsion composition are maintained.

The polyester (E) preferably has a carboxy group. When the polyester (E) has a carboxy group, the formation of a cross-linked structure by the crosslinking agent (F), etc., is enabled, thereby consequently enabling the adhesiveness to be further enhanced between the coating film formed from the emulsion composition, and the substrate and the adherend. When the polyester (E) has a carboxy group, the ratio of the carboxy group in the polyester (E) may be represented as an acid value of the polyester (E), and, for example, no less than 1 KOH mg/g and no greater than 30 KOH mg/g.

Commercially available products of the polyester (E) are exemplified by KA-5071S, KZT-8803, KT-8701, and KZT-9204 (each available from Unitika Limited), Bironal MD1200, MD1245, MD1480, MD1930, MD2000, and MD1500 (each available from Toyobo Co., Ltd.), Hi-tech PE series such as PES-H001 (available from Toho Chemical Industry Co., Ltd.), New track 2010 (available from Kao Corporation), Superflex210 (available from DKS Co. Ltd.), Plus Coat Z730, Z760, Z592, Z687, and Z690 (each available from Goo Chemical Co., Ltd.), and the like.

When the emulsion composition contains the polyester (E), the lower limit of the content of the polyester (E) in the emulsion composition with respect to 100 parts by mass of the total of the components other than the dispersion medium (C) is preferably 0.1 parts by mass and more preferably 0.3 parts by mass. On the other hand, the upper limit of the content of the polyester (E) with respect to 100 parts by mass of the total of the components other than the dispersion medium (C) is preferably 15 parts by mass, more preferably 10 parts by mass, and still more preferably 2.5 parts by mass. When the content of the polyester (E) falls within the above range, the further enhancement of the adhesiveness to the substrate and the adherend is enabled while the hardness of the coating film formed from the emulsion composition is maintained.

Crosslinking Agent (F)

When the emulsion composition contains the polyester (E) having a carboxy group, the crosslinking agent (F) accelerates crosslinking of the polyester (E). The crosslinking agent (F) is preferably a compound having a site that reacts with a carboxy group to form a bonding group. Examples of the site that forms a bonding group include an amino group (particularly, a melamine amino group), an oxazoline group, a carbodiimide group, an epoxy group, an isocyanate, and the like. The crosslinking agent (F) may be a low molecular compound (having, for example, the number average molecular weight of no greater than 10,000), or may be a polymer compound (having, for example, the number average molecular weight of greater than 10,000).

The crosslinking agent (F) is preferably an oxazoline group-containing water-soluble polymer, a methylated melamine resin, and a carbodiimide compound.

The upper limit of the carbodiimide equivalent of the carbodiimide compound is preferably 600, more preferably 400, and still more preferably 320. When the carbodiimide equivalent of the carbodiimide compound is no greater than the upper limit, the further enhancement of the bleed-out preventing properties is enabled, while the adhesiveness to the substrate of the coating film formed from the emulsion composition is maintained. On the other hand, the lower limit of the carbodiimide equivalent of the carbodiimide compound is, for example, 200. The term "carbodiimide equivalent" as referred to herein means a chemical formula weight per mol of the carbodiimide groups in the carbodiimide compound.

Commercially available products of the crosslinking agent (F) are exemplified by Epocros WS-500, WS-700, and K-2000 (each available from Nippon Shokubai Co., Ltd.), Carbodilite V-02, SV-02, V-02-L2, V-04, E-01, E-02, E-03A, and E-05 (each available from Nisshinbo Chemical Inc.), Nikalac MW-30M, MW-30, MW-11, MX-035, MX-45, and BX-4000 (each available from Sanwa Chemical Co., Ltd.), Elastron Series such as H-3 and MF-9 (each available from DKS Co Ltd.), and the like.

When the emulsion composition contains the crosslinking agent (F), the lower limit of the content of the crosslinking agent (F) in the emulsion composition with respect to 100 parts by mass of the total of the components other than the dispersion medium (C) is preferably 0.1 parts by mass, and more preferably 0.7 parts by mass. On the other hand, the upper limit of the content of the crosslinking agent (F) with respect to 100 parts by mass of the total of the components other than the dispersion medium (C) is preferably 10 parts by mass, more preferably 7.5 parts by mass, and still more preferably 5 parts by mass. When the content of the crosslinking agent (F) falls within the above range, the further acceleration of crosslinking of the polyester (E) is enabled. It is to be noted that the content of the crosslinking agent (F) as referred to herein means a value calculated based on the content of an active ingredient in either case of being supplied in a solution state or in a suspension state.

Polymerization Initiator (G)

The polymerization initiator (G) generates active species upon irradiation with light or heating to accelerate the polymerization of the polymerizable compound (A), leading to the enhancement of the hardness of the coating film formed from the emulsion composition. The polymerization initiator (G) may be a water-soluble compound or an oil-soluble compound.

The polymerization initiator (G) that generates the active species upon irradiation with light is exemplified by acetophenone, acetophenone benzyl ketal, 1-hydroxycyclohexyl phenyl ketone, 2,2-dimethoxy-1, 2-diphenyl ethan-1-one, 3-methylacetophenone, 4,4'-dimethoxybenzophenone, 4,4'-diaminobenzophenone, 1-(4-isopropylphenyl)-2-hydroxy-2-methylpropan-1-one, 2-hydroxy-2-methyl-1-phenylpropan-1-one, 2-methyl-1-[4-(methylthio)phenyl]-2-morpholinopropan-1-one, 2-benzyl-2-dimethylamino-1-(4-morpholinophenyl)-butanone-1,4-(2-hydroxyethoxy) phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, oligo(2-hydroxy-2-methyl-1-(4-(1-methylvinyl)phenyl)propanone), and the like.

The polymerization initiator (G) that generates the active species upon heating is exemplified by: organic peroxides such as hydroperoxides, peroxy esters, dialkyl peroxides, peroxy esters, diacyl peroxides, peroxy dicarbonates, peroxy ketals, and ketone peroxides; persulfuric acid salts such as ammonium persulfate, sodium persulfate, and potassium persufate; azo compounds such as 1,1'-azobis(cyclohexane-1-carbonitrile), 2,2'-azobis(N-butyl-2-methylpropionamide), 4,4'-azobis(4-cyanopentanoic acid), 2,2'-azobis[2-methyl-N-(2-hydroxyethyl)propionamide], 2,2'-azobis[N-(2-propenyl)-2-methylpropioamide], and 1-[(1-cyano-1-methylethyl)azo]formamide, and the like.

Commercially available products of the polymerization initiator (G) that generates the active species upon heating are exemplified by V-601, V-59, VF-096, VA-067, VE-073, VPS-1001, VPE-0201 (each available from Wako Pure Chemical Industries, Ltd.), and the like.

In addition to the above illustrative examples, the polymerization initiator (G) is further exemplified by the polymerization initiators disclosed in Japanese Unexamined Patent Application, Publication Nos. 2014-806, 2014-52493, 2014-199320 and 2015-071741, and the like.

The 10-hr half-life temperature of the polymerization initiator (G) is preferably greater than 65° C. The lower limit of the 10-hr half-life temperature of the polymerization initiator (G) is more preferably 75° C., still more preferably 80° C., and particularly preferably 85° C. On the other hand, the upper limit of the 10-hr half-life temperature of the polymerization initiator (G) is not particularly limited, and is, for example, 140° C. When the 10-hr half-life temperature of the polymerization initiator (G) falls within the above range, the effective acceleration of the polymerization of the polymerizable compound (A) during formation of the coating film from of the emulsion composition is enabled, thereby enabling the hardness of the coating film to be further enhanced. The term "10-hr half-life temperature" as referred to herein means a temperature that results in a half-life of 10 hours.

Of these, the polymerization initiator (G) is preferably a polymerization initiator that generates the active species upon heating, more preferably an azo polymerization initiator, and still more preferably an azo polymerization initiator having the 10-hr half-life temperature of greater than 65° C.

When the emulsion composition contains the polymerization initiator (G), the lower limit of the content of the polymerization initiator (G) in the emulsion composition is with respect to 100 parts by mass of the total of the components other than the dispersion medium (C) is preferably 0.01 parts by mass, more preferably 0.1 parts by mass, still more preferably 1 part by mass, and particularly preferably 2 parts by mass. On the other hand, the upper limit of the content of the polymerization initiator (G) with respect to 100 parts by mass of the total of the components other than the dispersion medium (C) is preferably 20 parts by mass, more preferably 10 parts by mass, and still more preferably 4 parts by mass. When the content of the polymerization initiator (G) falls within the above range, the further enhancement of the hardness of the coating film formed from the emulsion composition is enabled.

Levelling Agent (H)

The levelling agent (H) inhibits repellency upon the application of the emulsion composition, and thus further enhances the evenness of the applied film to be formed. The levelling agent (H) is different from the surfactant (B) in terms of the functions. The levelling agent (H) is exemplified by a polyorganosiloxane levelling agent, a fluorine levelling agent, an acrylic polymer levelling agent, and the like.

The levelling agent (H) is also exemplified by leveling agents disclosed in Japanese Unexamined Patent Application, Publication Nos. 2013-18921, 2014-133807 and 2014-162889, and the like. The levelling agent (H) may be used directly or may be subjected to condensation before use.

When the emulsion composition contains the levelling agent (H), the lower limit of the content of the levelling agent (H) in the emulsion composition with respect to 100 parts by mass of the total of the components other than the dispersion medium (C) is preferably 0.01 parts by mass, more preferably 0.1 parts by mass, and still more preferably 0.2 parts by mass. On the other hand, the upper limit of the content of the levelling agent (H) with respect to 100 parts by mass of the total of the components other than the dispersion medium (C) is preferably 10 parts by mass, more preferably 5 parts by mass, and still more preferably 3 parts by mass. When the content of the levelling agent (H) falls within the above range, the further inhibition of repellency upon the application of the emulsion composition is enabled.

The polymerization inhibitor inhibits the polymerization of the polymerizable compound (A) during storage to enhance the storage stability of the emulsion composition. Commercially available products of the polymerization inhibitor are exemplified by p-methoxyphenol, phenothiazine, and BHT (each available from Wako Pure Chemical Industries, Ltd.), IRGANOX1010 and IRGANOX1035 (each available from BASF), Sumilizer GA-80 (available from Sumitomo Chemical Co., Ltd.), Quino Power QS-30 and Quino Power QS-W10 (each available from Kawasaki Kasei Chemicals Ltd.), and the like. When the emulsion composition contains the polymerization inhibitor, the upper limit of the content of the polymerization inhibitor with respect to 100 parts by mass of the total of the components other than the dispersion medium (C) is preferably 1 part by mass and more preferably 0.5 parts by mass. When the content of the polymerization inhibitor falls within the above range, the enhancement of the polymerization of the polymerizable compound (A) and the storage stability of the emulsion composition is enabled in a well-balanced manner.

The lower limit of the acrylic group concentration in the components other than the dispersion medium (C) in the emulsion composition is preferably 5 mmol/g, more preferably 5.5 mmol/g, and still more preferably 6 mmol/g. On the other hand, the upper limit of the acrylic group concentration is preferably 12 mmol/g and more preferably 10 mmol/g. When the acrylic group concentration falls within the above range, the enhancement of the bleed-out preventing properties of the coating film formed from the emulsion composition is enabled. It is to be noted that the acrylic group concentration in the component other than the dispersion medium (C) as referred to herein means a value calculated by the following equation (A). In the equation (A), a polymerizable compound $(A)_i$ denotes any one compound among the polymerizable compounds (A) contained in the emulsion composition.

Acrylic group concentration (mmol/g) in components other than dispersion medium $(C)$=[1,000×Σ{(number of (meth)acryloyl groups that polymerizable compound $(A)_i$ has in one molecule)×(content (g) of polymerizable compound $(A)_i$)/(molecular weight of polymerizable compound $(A)_i$)}]/[total amount (g) of components other than dispersion medium $(C)$]:     Equation (A)

Production Method of Emulsion Composition

The production method of the emulsion composition includes: a "mixing step" of mixing the dispersion medium (C), the polymerizable compound (A), and the surfactant (B); and a "stress-applying step" of applying a stress to a mixture obtained by the mixing step, in which the oil droplet diameter $D_{90}$ corresponding to a diameter at cumulative 90% by volume in the oil droplet size distribution of the oil droplets obtained by the stress-applying step, measured according to the laser diffraction and scattering measurement process is less than 1.8 μm. According to the production method of the emulsion composition, the oil droplet diameter $D_{90}$ is enabled to be adjusted easily and reliably to fall within a desired range by applying the stress to the mixture of the polymerizable compound (A), the surfactant (B) and the dispersion medium (C), thereby consequently enabling the emulsion composition to be produced easily and reliably. It is to be noted that the mixing step and the stress-applying step may be carried out simultaneously. In other words, the stress may be applied appropriately to the obtained mixture while the dispersion medium (C), the polymerizable compound (A) and the surfactant (B) are being mixed. Each step will be described below.

Mixing Step

In this step, the polymerizable compound (A), the surfactant (B), the dispersion medium (C), and, as needed, an optional component, are mixed to obtain the mixture. The mixing process is not particularly limited, and a general process such as a stirring and mixing process may be employed.

Stress-Applying Step

In this step, the emulsion is prepared by applying a stress to the mixture obtained by the mixing step. Specifically, the preparation of the emulsion is carried out by applying the stress through both the surface chemical process employing a surfactant, and the mechanical process employing a propeller mixer, a turbine mixer, a homomixer, a disperser mixer, an ultra mixer, a colloid mill, a high-pressure homogenizer, an ultrasonic treatment, and the like. The preparation process is exemplified by: an agent-in-water procedure in which a surfactant is dissolved and dispersed in a water phase and then an oil phase is poured thereinto while being stirred; a phase inversion emulsification procedure in which a surfactant is dissolved and dispersed in an oil phase and then a water phase is poured thereinto while being stirred, during which a continuous phase is inverted from the oil phase into the water phase; a Nascent-soap procedure in which a fatty acid is dissolved in an oil phase and an alkali is dissolved in a water phase beforehand, and a soap is produced at the water/oil interface upon emulsification; an alternate addition procedure in which water and oil are added alternately by a small portion to a surfactant; and the like. It is to be noted that a high-pressure homogenizer treatment refers to a procedure that involves compressing a mixed fluid of a solid and a liquid, a mixed fluid having two or more types of liquids, and the like, by means of an ultra high pressure pump, for mixing, emulsifying, and/or dispersing. As a procedure of applying a stress to a mixture, the high-pressure homogenizer treatment is preferred in light of the adjustment of the oil droplet diameter of the oil droplets so as to fall within an appropriate range. In such a case, in light of the adjustment of the oil droplet diameter of the oil droplet so as to fall within a more appropriate range, it is preferred not to emulsify or disperse the mixture by other treatment such as ultrasonic irradiation prior to the high-pressure homogenizer treatment. In the following, the emulsion preparation process using the high pressure homogenizer is described.

The lower limit of the compression pressure in the high pressure homogenizer treatment is preferably 10 MPa, more preferably 20 MPa, and still more preferably 30 MPa. On the other hand, the upper limit of the compression pressure is preferably 300 MPa, more preferably 270 MPa, and still more preferably 250 MPa. Furthermore, the lower limit of the treatment time period of the high pressure homogenizer treatment is preferably 10 min, and more preferably 30 min. On the other hand, the upper limit of the treatment time period is preferably 180 min, and more preferably 120 min. When the compression pressure and treatment time period in the high pressure homogenizer treatment falls within the above range, the easy and reliable adjustment of the oil droplet diameter $D_{90}$ so as to fall within a desired range is enabled.

The treatment temperature in the high pressure homogenizer treatment is, for example, no less than 5° C. and no greater than 50° C., in light of the inhibition of the denaturation of each component.

Laminate

The laminate includes a substrate and a coating film overlaid on at least one face of the substrate, and the coating film is formed from the emulsion composition. The average total thickness of the laminate is, for example, no less than 10 μm and no greater than 1,000 μm. Although the laminate may be used as is, the laminate on which an adherend such as a hard coat layer is overlaid on an opposite face of the coating film to the substrate is typically used for the purpose of improving weather resistance, scuff resistance, and the like. Due to the coating film having superior bleed-out preventing properties, the laminate is capable of preventing the bleed-out of relatively low molecular components such as a plasticizer, a coloring material, and an oligomer contained in the substrate. As a result, the appearance thereof is unlikely to deteriorate, and the adhesiveness to the adherend is unlikely to decrease.

Substrate

The substrate included in the laminate typically has a film-like shape. When the substrate has a film-like shape, the average thickness may be, for example, no less than 5 μm and no greater than 800 μm.

The principal component of the substrate is not particularly limited as long as it is a resin, and polyethylene terephthalate, polybutylene terephthalate, polyethylene naphthalate, polypropylene, an ethylene-vinyl acetate copolymer, polycarbonate, polyamide, polyimide, polyamideimide, polyphenylene ether, polyphenylenesulfide, polyarylate and polysulfone are preferred, and polyethylene terephthalate is more preferred.

Coating Film

The coating film included in the laminate has the superior adhesiveness to the substrate and the superior adhesiveness to the adherend such as a hard coat layer having a photocurable resin, a thermosetting resin, a thermoplastic resin or the like, as a principal component. Therefore, when the adherend is formed on the opposite face of the coating film to the substrate, the coating film enables the adhesiveness of the substrate and the adherend to be easily and reliably enhanced. Therefore, the coating film is preferably used as an easily adhesive layer.

The lower limit of the average thickness of the coating film is preferably 0.01 μm and more preferably 0.05 μm. On the other hand, the upper limit of the average thickness of the coating film is preferably 1 μm, more preferably 0.5 μm, and still more preferably 0.2 μm. When the average thickness of the coating film falls within the above range, the further enhancement of the adhesiveness to the substrate and the adherend is enabled.

When the hard coat layer is formed on the laminate, examples of a paint used for the hard coat layer include a UV curing ink, a UV curing adhesive, a paint containing a photocurable resin such as a hard coating agent, a paint containing a thermosetting resin such as a silicone coating agent, and a paint containing a thermoplastic resin such as polycarbonate. As a paint containing the photocurable resin, a paint containing the UV-curable resin is preferred. The average thickness of the hard coat layer is, for example, no less than 0.1 μm and no greater than 30 μm.

Since the laminate having the hard coat layer formed thereon has a surface superior in weather resistance, scuff resistance, etc., the laminate may be suitably used as a surface protective film, an antireflective film, etc. for a flat panel display device, a solar cell, a touch screen, and the like. In addition to the aforementioned intended usage, the laminate having the hard coat layer formed thereon may be used for a wide range of applications, as various materials for construction, vehicles, and the like.

Production Method of Laminate

The production method of the laminate involves: a step of applying the emulsion composition on at least a substrate or one face of a resin film that is a substrate-forming material (applying step); and a step of heating an applied film obtained by the applying step (heating step). When the emulsion composition is applied on at least one face of the resin film by the applying step, the production method of the laminate may further involve a step of stretching the resin film after the applying step (stretching step). According to the production method of the laminate, the easy and reliable production of the laminate is enabled. In the following, each step is described.

Applying Step

In this step, the emulsion composition is applied on at least one face of the substrate or the resin film that is a substrate-forming material.

As the resin film that is a substrate-forming material, an unstretched resin film obtained by molding a resinous material into a sheet-like shape, a stretched resin film obtained by stretching the unstretched resin film, and the like may be employed.

The unstretched resin film is obtained by molding the resinous material into a sheet-like shape through a melt extrusion procedure, a melt casting procedure, a calender procedure, and the like. As the molding process of the resinous material, a melt extrusion procedure is preferred. A molding apparatus for use in the melt extrusion procedure is exemplified by a single-screw extruder, a twin-screw extruder, and the like. Furthermore, the melting temperature in the melt extrusion procedure is, for example, no less than 200° C. and no greater than 300° C. As the resinous material, a thermoplastic resin in the form of pellets is preferred. In this case, it is preferred that the thermoplastic resin in the form of pellets is sufficiently dried in advance. The unstretched resin film that is molded in a sheet-like shape is preferably cooled and hardened by winding around a cooling roller having a temperature of, for example, no less than 0° C. and no greater than 50° C. through an electrostatic casting procedure.

The stretched resin film is obtained by stretching the unstretched resin film in a longitudinal direction (machine direction) or in a transverse direction. The stretched resin film obtained by stretching the unstretched resin film in the longitudinal direction (machine direction) is preferred. The stretching procedure of the unstretched resin film in a longitudinal direction is exemplified by a procedure of stretching to no less than twice and no greater than 5 times an original length by means of, for example, a heated roller, and the like. The lower limit of the roller temperature is preferably 80° C. On the other hand, the upper limit of the roller temperature is preferably 120° C. and more preferably 100° C. The stretching procedure of the unstretched resin film in the transverse direction is exemplified by a procedure of holding an end of the film by an appropriate means such as a clip to introduce the film into a hot air zone, thereby stretching the film to no less than 2.5 times and no greater than 5 times an original length, and the like. The lower limit of the temperature of the hot air zone is preferably 70° C. and more preferably 80° C. On the other hand, the upper limit of the temperature of the hot air zone is preferably 140° C. and more preferably 120° C.

The procedure of applying the emulsion composition on the substrate or the resin film that is a substrate-forming material is not particularly limited, and examples of the procedure include a gravure coating procedure, a die coating procedure, a spray coating procedure, a wire bar coating procedure, a reverse roll coating procedure, a curtain coating procedure, a dip coating procedure, and the like.

Stretching Step

In this step, the resin film having the emulsion composition applied on at least one face of the resin film is stretched. The stretching direction of the resin film may be the longitudinal direction (machine direction), the transverse direction, or both the longitudinal direction and the transverse direction. However, when the resin film is a stretched resin film, such a stretched resin film is preferably stretched in a direction in which the stretched resin film has not been stretched during the production thereof. The stretching procedure of the resin film is exemplified by procedures similar to those exemplified for the stretching procedure of the unstretched resin film, and the like.

Heating Step

In this step, the applied film obtained by the applying step is heated. By this step, the polymerizable compound (A) of the emulsion composition is polymerized, leading to the hardening of the applied film and in turn formation of a coating film. Furthermore, when the resin film is stretched in the stretching step, the promotion of the crystalline orientation of the resin film is enabled. The heating temperature is, for example, no less than 160° C. and no greater than 240° C. In addition, the heating time period is, for example, no less than 1 sec and no greater than 60 sec.

When the emulsion composition contains the polymerization initiator (G) that generates the active species upon irradiation with light, the applied film obtained by the applying step is preferably irradiated with light prior to the heating step. Due to thus irradiating the applied film with light prior to the heating step, the promotion of the generation of the active species from the polymerization initiator (G) contained in the emulsion composition is enabled. A procedure of the light irradiation is exemplified by ultraviolet ray irradiation using a high-pressure mercury vapor lamp, and the like. The irradiation dose of the light irradiation is, for example, no less than 1,000 J/m$^2$ and no greater than 5,000 J/m$^2$.

OTHER EMBODIMENTS

The preferred embodiments of the present invention have been described above, but the present invention is not limited to these embodiments. For example, in the preferred embodiments, the examples in which the emulsion composition of the present invention is applied for the production of the laminate including the substrate having a resin as a principal component has been described; however, the present invention is not limited thereto, and may be applied for the production of the laminate including a substrate having a material such as a metal, glass, ceramic, and the like, other than the resin, as a principal component.

EXAMPLES

Hereinafter, the present invention is explained in detail by way of Examples, but the present invention is not in any way limited to these Examples.

Synthesis of Polymerizable Compound (A)

As the polymerizable compound (A), polyfunctional urethane acrylates 2 to 9 were synthesized.

Synthesis Example 1: Synthesis of Polyfunctional Urethane Acrylate 2

30.76 g of NK ester A-9570W (hydroxyl group value: 90 mg KOH/g, Shin-Nakamura Chemical Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 4.19 g of hexamethylene diisocyanate (HDI, Tosoh Corporation) being dissolved in 15 g of methylisobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301 (reacting with excessive dibutylamine, and then carrying out back titration of a residual portion with a hydrochloric acid; using bromophenol blue as an indicator). A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 2 thus synthesized was 3,270.

Synthesis Example 2: Synthesis of Polyfunctional Urethane Acrylate 3

30.20 g of NK ester A-9570W (hydroxyl group value: 90 mg KOH/g, Shin-Nakamura Chemical Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 4.75 g of 1,3-bis(isocyanato methyl)cyclohexane (TAKENATE 600, Mitsui Chemicals, Inc.) being dissolved in 15 g of methylisobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301. A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 3 thus synthesized was 2,860.

Synthesis Example 3: Synthesis of Polyfunctional Urethane Acrylate 4

29.63 g of NK ester A-9570W (hydroxyl group value: 90 mg KOH/g, Shin-Nakamura Chemical Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 5.33 g of isophorone diisocyanate (Desmodur I, Sumika Bayer Urethane Co., Ltd.) being dissolved in 15 g of methylisobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301. A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 4 thus synthesized was 2,940.

Synthesis Example 4: Synthesis of Polyfunctional Urethane Acrylate 5

30.54 g of NK ester A-9570W (hydroxyl group value: 90 mg KOH/g, Shin-Nakamura Chemical Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 4.41 g of 2,5-bis (isocyanato methyl)bicyclo[2.2.1]heptane (Cosmonate NBDI, Mitsui Chemicals, Inc.) being dissolved in 15 g of methyl isobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301. A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 5 thus synthesized was 2,690.

Synthesis Example 5: Synthesis of Polyfunctional Urethane Acrylate 6

33.70 g of Alonix M-402 (hydroxyl group value: 25 mg KOH/g, Toa Gosei Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 1.26 g of hexamethylene diisocyanate (HDI, Tosoh Corporation) being dissolved in 15 g of methyl isobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301. A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 6 thus synthesized was 1,238.

Synthesis Example 6: Synthesis of Polyfunctional Urethane Acrylate 7

33.50 g of Alonix M-402 (hydroxyl group value: 25 mg KOH/g, Toa Gosei Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 1.45 g of 1,3-bis(isocyanato methyl)cyclohexane (TAKENATE 600, Mitsui Chemicals, Inc.) being dissolved in 15 g of methyl isobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301. A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 7 thus synthesized was 1,241.

Synthesis Example 7: Synthesis of Polyfunctional Urethane Acrylate 8

33.31 g of Alonix M-402 (hydroxyl group value: 25 mg KOH/g, Toa Gosei Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 1.65 g of isophorone diisocyanate (Desmodur I, Sumika Bayer Urethane Co., Ltd.) being dissolved in 15 g of methyl isobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301. A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 8 thus synthesized was 1,210.

Synthesis Example 8: Synthesis of Polyfunctional Urethane Acrylate 9

30.08 g of Alonix M-402 (hydroxyl group value: 25 mg KOH/g, Toa Gosei Co., Ltd.), 20 g of methyl isobutyl ketone, 0.008 g of 3,5-di-t-butyl-4-hydroxytoluene (H-BHT, Honshu Chemical Industry Co., Ltd.) and 0.033 g of dioctyltin laurate (KS-1200A-1, Kyodo Chemical Co., Ltd.) were charged into a separable flask equipped with a condenser tube, a dropping funnel, a stirrer and a thermometer. Then, 4.88 g of isocyanurate form of isophorone diisocyanate (VESTANAT T1890/100, Evonik Industries) being dissolved in 15 g of methyl isobutyl ketone was charged into the dropping funnel, and the solution was added dropwise at room temperature while the content inside the separable flask was stirred. The rate of the dropwise addition was controlled such that the temperature was maintained at no greater than 30° C. After the completion of the dropwise addition, the temperature of the content was elevated to 60° C. to sustain the reaction. The reaction was sustained until the reaction ratio became no less than 90% while the concentration of a residual isocyanate was monitored according to JIS K7301. A reaction mixture was subjected to vacuum concentration while being bubbled by dry air, and the concentration of methyl isobutyl ketone was controlled to be no greater than 2% by mass. The molecular weight measured according to GPC of the polyfunctional urethane acrylate 9 thus synthesized was 3,518.

Preparation of Emulsion Composition

Components used for the preparation of each emulsion composition are shown below. It is to be noted that each used amount shown in Tables 1 to 3 indicate the mass of the solid content of each component.

Polymerizable Compound (A)

Dipentaerythritol hexaacrylate: molecular weight: 578.56, number of functional groups: 6

Dipentaerythritol pentaacrylate: molecular weight: 524.51, number of functional groups: 5

Pentaerythritol triacrylate: molecular weight: 298.29, number of functional groups: 3

Ethylene oxide-modified hexaacrylate of dipentaerythritol: molecular weight: 1107.19, number of functional groups: 6

Polyfunctional urethane acrylate 1: "U-6LPA" available from Shin-Nakamura Chemical Co., Ltd., molecular weight: 760, number of functional groups: 6

Polyfunctional urethane acrylate 2: polyfunctional urethane acrylate 2 synthesized in Synthesis Example 1

Polyfunctional urethane acrylate 3: polyfunctional urethane acrylate 3 synthesized in Synthesis Example 2

Polyfunctional urethane acrylate 4: polyfunctional urethane acrylate 4 synthesized in Synthesis Example 3

Polyfunctional urethane acrylate 5: polyfunctional urethane acrylate 5 synthesized in Synthesis Example 4

Polyfunctional urethane acrylate 6: polyfunctional urethane acrylate 6 synthesized in Synthesis Example 5

Polyfunctional urethane acrylate 7: polyfunctional urethane acrylate 7 synthesized in Synthesis Example 6

Polyfunctional urethane acrylate 8: polyfunctional urethane acrylate 8 synthesized in Synthesis Example 7

Polyfunctional urethane acrylate 9: polyfunctional urethane acrylate 9 synthesized in Synthesis Example 8

Polyethylene glycol diacrylate: molecular weight: 708, number of functional groups: 2

Polypropylene glycol diacrylate: molecular weight: 808, number of functional groups: 2

Polytetramethylene glycol diacrylate: molecular weight: 758, number of functional groups: 2

Bifunctional urethane acrylate: "UA-W2A" available from Shin-Nakamura Chemical Co., Ltd., molecular weight: 3,500, number of functional groups: 2, polyether-based Surfactant (B)

SF1: anionic surfactant ("Newcol 707SF" available from Nippon Nyukazai Co., Ltd.), polyoxyethylene polycyclic phenyl ether sulfuric acid ester salt, an aqueous solution having a solid content concentration of 30% by mass SF2: anionic reactive surfactant ("Aqualon BC-20" available from DKS Co., Ltd.), and polyoxyethylene nonyl propenyl phenyl ether ammonium sulfate SF3: anionic reactive surfactant ("Latemul PD105" available from Kao Corporation), and polyoxyalkylene alkenyl ether ammonium sulfate SF4: anionic reactive surfactant ("RE1000" available from Nippon Nyukazai Co., Ltd.)

Dispersion Medium (C)

Water

Inorganic Particles (D)

CSi: colloidal silica having the volume average particle diameter of 35 nm obtained by modifying a colloidal silica dispersion liquid (available from Fuso Chemical Co., Ltd.) with 3-methacryloxypropyltrimethoxysilane, a water-dispersion liquid having the solid content concentration of 20% by mass, acrylic equivalent: 5,000 g/eq Polyester (E)

PE1: polyester emulsion ("KA5071S" available from Unitika Limited), glass transition temperature: 66° C., number average molecular weight: 8,000, solid content concentration: 30% by mass PE2: water-dispersion polyester ("Vylonal MD1245" available from Toyobo Co., Ltd.), solid content concentration: 34% by mass, number average molecular weight: 20,000, solid content concentration: 30% by mass Crosslinking Agent (F)

Oxazoline group-containing water-soluble polymer: "Epocros WS-500" available from Nippon Shokubai Co., Ltd., solid content concentration: 35% by mass Methylated melamine resin: "MW-30M" available from Sanwa Chemical Co., Ltd Carbodiimide 1: "Carbodilite V-02" available from Nisshinbo Chemical Inc., solid content concentration: 40% by mass, carbodiimide equivalent: 590

Carbodiimide 2: "Carbodilite SV-02" available from Nisshinbo Chemical Inc., solid content concentration: 40% by mass, carbodiimide equivalent: 430

Carbodiimide 3: "Carbodilite V-04" available from Nisshinbo Chemical Inc., solid content concentration: 40% by mass, carbodiimide equivalent: 335

Carbodiimide 4: "Carbodilite E-02" available from Nisshinbo Chemical Inc., solid content concentration: 40% by mass, carbodiimide equivalent: 445

Carbodiimide 5: "Carbodilite E-03A" available from Nisshinbo Chemical Inc., solid content concentration: 40% by mass, carbodiimide equivalent: 365

Carbodiimide 6: "Carbodilite E-05" available from Nisshinbo Chemical Inc., solid content concentration: 40% by mass, carbodiimide equivalent: 310

Polymerization Initiator (G)

1-hydroxycyclohexyl phenyl ketone 2-methyl-1-[4-(methylthio)-phenyl]-2-morpholinopropan-1-one 2,2'-azobis(N-butyl-2-methylpropionamide): 10-hr half-life temperature: 110° C.

α,α'-di(t-butylperoxy)diisopropylbenzene: 10-hr half-life temperature: 119° C.

1,1'-azobis(cyclohexane-1-carbonitrile): 10-hr half-life temperature: 88° C.

4,4'-azobis(4-cyanopentanoic acid): 10-hr half-life temperature: 69° C.

2,2'-azobis[2-methyl-N-(2-hydroxyethyl)propionamide]: 10-hr half-life temperature: 86° C.

azobis(isobutyronitrile): 10-hr half-life temperature: 65° C.

Levelling Agent (H)

Polyorganosiloxane levelling agent: polyether-modified dimethylsiloxane ("BYK-349" available from Bigchemi Japan Co., Ltd.)

Fluorine levelling agent: Ftergent 215M (available from Neos Company Limited)

Other Components

Acrylic emulsion: "AE373D" available from Emulsion Technology Co., Ltd., latex having solid content concentration of 50% by mass Polyester emulsion: polyester emulsion obtained by the method of Example 1 disclosed in Japanese Unexamined Patent Application, Publication No. 2015-124291

Examples 1 to 41

Components of the types and amounts shown in Tables 1 to 3 were each mixed with water, and a mixture thus obtained was subjected to a high pressure homogenizer treatment under conditions involving a compression pressure of 200 MPa, a treatment time period of 60 min, and a treatment temperature of 25° C., by using a high-pressure homogenizer ("C-ES008C" available from Yoshida Kikai Co., Ltd.) to prepare emulsion compositions of Examples 1 to 27 having the solid content concentration of 10% by mass.

Comparative Examples 1 to 10

Components of the types and amounts shown in Table 3 were mixed with water, and each mixture thus obtained was subjected to a high pressure homogenization treatment under conditions involving a compression pressure of 70 MPa, a treatment time period of 60 min, and a treatment temperature of 25° C., by using a high-pressure homogenizer ("C-ES008C" available from Yoshida Kikai Co., Ltd.) to prepare emulsion compositions of Comparative Examples 1 to 10 having the solid content concentration of 10% by mass.

Oil Droplet Diameter Measurement

The oil droplet size distribution of each of the obtained emulsion compositions was measured by using a laser diffraction and scattering particle size distribution measurement apparatus ("MT3000II" available from Nikkiso Co., Ltd.). Based on the measurement results of the oil droplet size distribution, "oil droplet diameter $D_{50}$ corresponding to a diameter at cumulative 50% by volume" which means an oil droplet diameter for which the distribution curve of integration % indicates 50% by volume, "oil droplet diameter $D_{90}$ corresponding to a diameter at cumulative 90% by volume" which means an oil droplet diameter for which the distribution curve of integration % indicates 90% by volume, and "maximum oil droplet diameter $D_{max}$ which means a maximum oil droplet diameter that is detected as a value having the frequency of greater than 0. The measurement results are shown in Tables 1 to 3.

Each of the obtained emulsion compositions was evaluated by using the laminate produced according to the following process. The evaluation results are shown in Tables 1 to 3. First, materials used for the production of the laminate other than the emulsion compositions are shown below.

Resin Film

PET pellets (homopolymer) were dried sufficiently, and then fed into a single-screw extruder. The pellets were then melted therein at 250° C. and extruded from a T-die to be formed in a sheet-like shape, and then cooled and hardened by winding around a cooling roller at 45° C. through an electrostatic casting procedure, to obtain an unstretched PET film. The unstretched PET film was heated to 90° C. and stretched to 3 times an original length in the longitudinal direction to obtain a single-screw stretched PET film. This single-screw stretched PET film was provided as a resin film that is a substrate-forming material.

Production of Laminate

Each of the emulsion compositions of Examples 1 to 27 and Comparative Examples 1 to 10 was applied on one face of the resin film through a reverse roll coating procedure. Next, the resin film having the emulsion composition applied thereon was introduced to a preheating zone, heated and dried at a temperature of 130° C. for 1 min, and then stretched to 3 times an original length in the transverse direction at 90° C. It is to be noted that, since the resin film was stretched to 3 times an original length in the longitudinal direction and to 3 times an original length in the transverse direction, the total stretching ratio was 9.0. Thereafter, the resin film was introduced into a heat-hardening zone to be heated at 230° C. for 30 seconds for heat-hardening of an applied film, to obtain a laminate including a substrate having an average thickness of 188 µm and a coating film overlaid on one face of the substrate and having an average thickness of about 0.1 µm.

In addition, when the laminates were produced by using the emulsion compositions of Examples 16 and 17 containing the polymerization initiator (G) that generates active species upon irradiation with light, an ultraviolet ray irradiation treatment with the irradiation dose of 3,000 J/m$^2$ using a high-pressure mercury vapor lamp was carried out prior to the introduction of the resin film having the emulsion composition applied thereon into the heat-hardening zone.

Appearance after Application

Coating films of the laminates were visually observed immediately after the formation and evaluated according to the following criteria:

A: surface being smooth and no blooming being observed;

B: surface being slightly rough, or slight blooming being observed; and

C: surface condition being extremely poor.

Adhesiveness Between Substrate and Coating Film

According to JIS-K5600-5-6: 1999, the adhesiveness between the substrate of the laminate and the coating film was measured through a crosscut process, and evaluated according to the following criteria:

A: no separation being found in any grid;

B: separation being found in greater than 0% and less than 10% of grids; and

C: separation being found in no less than 10% of grids, or coating film is broken.

Adhesiveness Between Laminate and Hard Coat Layer Before Heating

A UV-curable hard coat material ("OPSTAR KZ6445A" available from JSR Corporation) was applied on a coating film of the laminate to give an average thickness of 5 µm, and an exposure of 300 mJ/cm$^2$ (cumulative amount of exposure having a wavelength of 365 nm) was performed in air by using a high-pressure mercury vapor lamp, to overlay a hard coat layer on the laminate. Next, according to JIS-K5600-5-6: 1999, the adhesiveness between the laminate and the hard coat layer was measured through a crosscut process, and evaluated according to the following criteria:

A: no separation being found in any grid;

B: separation being found in greater than 0% and less than 10% of grids; and

C: separation being found in no less than 10% of grids.

Adhesiveness Between Laminate and Hard Coat Layer after Heating

The laminate having a hard coat layer overlaid thereon was produced by carrying out the same process as the process described in the evaluation of the adhesiveness between the laminate and the hard coat layer before heating. Next, the laminate having the hard coat layer overlaid thereof was heated at a temperature of 150° C. for 90 min. After heating, according to JIS-K5600-5-6: 1999, the adhesiveness between the laminate and the hard coat layer was measured through a crosscut process, and evaluated according to the following criteria:

A: no separation being found in any grid;

B: separation being found in greater than 0% and less than 10% of grids; and

C: separation being found in no less than 10% of grids.

Oligomer Blocking Properties

The Haze of the laminate was measured according to JIS-K7136: 2000. Next, the laminate was heated at 150° C. for 90 min. After heating, the component that was bled out on a substrate-side face of the laminate was wiped off with a piece of gauze having been impregnated with isopropanol. Thereafter, the Haze of the laminate was measured again and a difference in the Haze before and after the heating (ΔHaze: value obtained by subtracting Haze after heating from Haze before heating) was calculated. In this context, since the substrate of the laminate contains a polyester oligomer as an inevitable impurity, when the polyester oligomer permeates the coating film due to the heating and is bled out on the coating-film side of the laminate, ΔHaze increases. Therefore, ΔHaze serves as an indicator for the performance of inhibiting permeation of the polyester oligomer (oligomer blocking properties) of the coating film. A smaller value of ΔHaze indicates superior oligomer blocking properties. The oligomer blocking properties were evaluated according to the following criteria:

AAA: ΔHaze being less than 0.3, indicating extremely favorable oligomer blocking properties;

AA: ΔHaze being no less than 0.3 and less than 0.5, indicating highly favorable oligomer blocking properties;

A: ΔHaze being no less than 0.5 and less than 1, indicating favorable oligomer blocking properties; and B: ΔHaze being no less than 1, indicating insufficient oligomer blocking properties.

Coloring-Material Blocking Properties 100 parts by mass of PET pellets (homopolymer) were dried, and then melt-kneaded by an extruder with 0.4 parts by mass of a perynone coloring material ("Diaresin Red HS" available from Mitsubishi Chemical Corporation), 0.8 parts by mass of an anthraquinone coloring material ("Diaresin Blue H3G" available from Mitsubishi Chemical Corporation), and 0.3 parts by mass of an isoquinoline coloring material ("Diaresin Yellow F" available from Mitsubishi Chemical Corporation), to obtain a coloring material-containing polyester. Except that the coloring material-containing polyester was employed in place of the PET pellets (homopolymer), a method similar to the aforementioned production method of the laminate was carried out to obtain a colored laminate having a colored substrate and a coating film overlaid on one face of the colored substrate.

The colored laminate was heated in an oven at 180° C. for 10 min. After heating, the coating-film side surface of the colored laminate was washed with 20 mL of dimethylformamide, and the washing liquid was collected. An operation of washing the coating-film side surface of the colored laminate with the collected washing liquid and then collecting the washing liquid was repeated several times. The washing liquid having been used for washing the colored laminate several times was introduced into a quartz cell having an optical path length of 10 mm to measure an $L^*$ value, an $a^*$ value, and a $b^*$ value under conditions involving a field of view of 2° and the standard illuminant D65, using a color meter (Suga Test Instruments Co., Ltd.). In a similar manner, an $L^*$ value, an $a^*$ value, and a $b^*$ value of dimethylformamide as reference vales were measured, and then $\Delta L^*$ (value obtained by subtracting $L^*$ value of dimethylformamide from $L^*$ value of washing liquid), $\Delta a^*$ (value obtained by subtracting $a^*$ value of dimethylformamide from $a^*$ value of washing liquid), and $\Delta b^*$ (value obtained by subtracting $b^*$ value of dimethylformamide from $b^*$ value of washing liquid) were calculated. These values were respectively plugged into the following equation (B) to calculate a $\Delta E^*ab$ value of the washing liquid on the basis of dimethylformamide as a reference. When the coloring material contained in the colored substrate permeates the coating film due to the heating and thus bled out, since the coloring material that was bled out was collected by the washing liquid, the $\Delta E^*ab$ value of the washing liquid increases. Therefore, the $\Delta E^*ab$ value serves as an indicator for the performance of inhibiting permeation of the coloring material (coloring-material blocking properties) of the coating film. A smaller value of $\Delta E^*ab$ indicates superior coloring-material blocking properties. The coloring-material blocking properties were evaluated according to the following criteria:

$$\Delta E^*ab \text{ value} = [(\Delta L^* \text{ value})^2 + (\Delta a^* \text{ value})^2 + (\Delta b^* \text{value})^2]^{1/2}: \quad \text{equation (B)},$$

AAA: $\Delta E^*ab$ being no greater than 3, indicating extremely favorable coloring-material bleed-blocking properties;

AA: $\Delta E^*ab$ value being greater than 3 and no greater than 5, indicating highly favorable coloring-material bleed-blocking properties;

A: $\Delta E^*ab$ value being greater than 5 and no greater than 10, indicating favorable coloring-material bleed-blocking properties; and B: $\Delta E^*ab$ value being greater than 10, indicating insufficient coloring-material bleed-blocking properties.

| | Molecular weight | Acrylic equivalent (g/eq) | Carbodiimide equivalent | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|---|---|
| Polymerizable compound (A) | | | | | | | | | | | | | | | | | | | | | |
| Dipentaerythritol hexaacrylate | 579 | 96 | | 70 | 70 | 70 | 60 | 60 | 65 | 65 | 65 | 60 | 60 | 70 | 70 | 70 | 70 | 70 | 70 | 70 | 70 |
| Dipentaerythritol pentaacrylate | 525 | 105 | | 30 | 30 | 30 | 20 | 20 | 25 | 25 | 25 | 20 | 20 | 30 | 30 | 30 | 30 | 30 | 30 | 30 | 30 |
| Pentaerythritol triacrylate | 298 | 99 | | | | | 20 | | | | | | | | | | | | | | |
| Ethylene oxide-modified hexaactylate of dipentaerythritol | 1,107 | 185 | | | | | | 20 | | | | | | | | | | | | | |
| Polyfunctional urethane acrylate 1 | 760 | 127 | | | | | | | | | | | 20 | | | | | | | | |
| Polyfunctional urethane acrylate 2 | 3,270 | 106 | | | | | | | 10 | | | | | | | | | | | | |
| Polyfunctional urethane acrylate 3 | 2,860 | 107 | | | | | | | | 10 | | | | | | | | | | | |
| Polyfunctional urethane acrylate 4 | 2,940 | 108 | | | | | | | | | 10 | | | | | | | | | | |
| Polyfunctional urethane acrylate 5 | 2,690 | 107 | | | | | | | | | | 20 | | | | | | | | | |
| Polyfunctional urethane acrylate 6 | 1,238 | 99 | | | | | | | | | | | | | | | | | | | |
| Polyfunctional urethane acrylate 7 | 1,241 | 99 | | | | | | | | | | | | | | | | | | | |
| Polyfunctional urethane acrylate 8 | 1,210 | 99 | | | | | | | | | | | | | | | | | | | |
| Polyfunctional urethane acrylate 9 | 3,518 | 101 | | | | | | | | | | | | | | | | | | | |
| Polyethylene glycol diacrylate | 708 | 354 | | | | | | | | | | | | | | | | | | | |
| Polypropylene glycol diacrylate | 808 | 404 | | | | | | | | | | | | | | | | | | | |
| Polytetramethylene glycol diacrylate | 758 | 379 | | | | | | | | | | | | | | | | | | | |
| Bifunctional | 3,500 | 1,750 | | | | | | | | | | | | | | | | | | | |

-continued-

| | | Molecular weight (g/eq) | Acrylic equivalent | Carbodiimide equivalent | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|---|---|---|
| Surfactant (B) | urethane acrylate | | | | | | | | | | | | | | | | | | | | | |
| | SF1 | | | | 5 | 5 | 5 | 5 | 5 | 5 | 5 | 5 | 5 | 5 | 5 | 5 | 5 | 5 | 5 | 5 | 5 | 5 |
| | SF2 | | | | | | | | | | | | | | | | | | | | | |
| | SF3 | | | | | | | | | | | | | | | | | | | | | |
| | SF4 | | | | | | | | | | | | | | | | | | | | | |
| Inorganic particles (D) | Csi | 5,000 | | | 50 | 80 | | | | | | | | | | | | | | | | |
| Polyester (E) | PE1 | | | | | | | | | | | | | | 2 | | | | | | | |
| | PE2 | | | | | | | | | | | | | | | | | | | | | |
| Crosslinking Agent (F) | Oxazoline group-containing water soluble polymer | | | | 1 | 1 | 1 | 1 | 1 | 1 | 1 | 1 | 1 | 1 | 2 | 2 | 2 | 2 | 2 | 2 | 2 | 2 |
| | Methylated melamine resin | | | | | | | | | | | | | | | | | | | | | |
| | Carbodiimide compound 1 | | | 590 | | | | | | | | | | 1 | | | 1 | | | | | |
| | Carbodiimide compound 2 | | | 430 | | | | | | | | | | | | | | 1 | | | | |
| | Carbodiimide compound 3 | | | 335 | | | | | | | | | | | | | | | 1 | | | |
| | Carbodiimide compound 4 | | | 445 | | | | | | | | | | | | | | | | 3 | | |
| | Carbodiimide compound 5 | | | 365 | | | | | | | | | | | | | | | | | 3 | |
| | Carbodiimide compound 6 | | | 310 | | | | | | | | | | | | | | | | | | 3 |
| Polymerization Initiator (G) | 1-hydroxycyclohexyl phenyl-ketone | | | | | | | | | | | | | | | | | | | | | |
| | 2-methyl-1-[4-(methylthio)-phenyl]-2-morpholinopropan-1-one | | | | | | | | | | | | | | | | | | | | | |
| | 2,2′-azobis(N-butyl-2-methyl-propionamide) | | | | | | | | | | | | | | | | | | | | | |
| | α,α′-di(t-butylperoxy)diisopropylbenzene | | | | | | | | | | | | | | | | | | | | | |
| | 1,1′-azobis(cyclohexane-1-carbonitrile) | | | | | | | | | | | | | | | | | | | | | |
| | 4,4′-azobis(4-cyanopentanoic acid) | | | | | | | | | | | | | | | | | | | | | |
| | 2,2′-azobis[2-methyl-N-(2-hy- | | | | | | | | | | | | | | | | | | | | | |

-continued

|  | Molecular weight | Acrylic equivalent (g/eq) | Carbodiimide equivalent | Examples (parts by mass) | | | | | | | | | | | | | | | | |
|---|---|---|---|---|---|---|---|---|---|---|---|---|---|---|---|---|---|---|---|---|
|  |  |  |  | 1 | 2 | 3 | 4 | 5 | 6 | 7 | 8 | 9 | 10 | 11 | 12 | 13 | 14 | 15 | 16 | 17 | 18 |
| droxyethyl)propionamide] azobis isobutyronitrile |  |  |  |  |  |  |  |  |  |  |  |  |  |  |  |  |  |  |  |  |  |
| Levelling agent (H) Polyorganosiloxane levelling agent |  |  |  |  |  |  |  |  |  |  |  |  |  |  |  |  |  |  |  |  |  |
| Fluorine levelling agent |  |  |  |  |  |  |  |  |  |  |  |  |  |  |  |  |  |  |  |  |  |
| Other components Acrylic emulsion |  |  |  |  |  |  |  |  |  |  |  |  |  |  |  |  |  |  |  |  |  |
| Polyester emulsion |  |  |  |  |  |  |  |  |  |  |  |  |  |  |  |  |  |  |  |  |  |
| Total parts by mass |  |  |  | 106 | 156 | 186 | 106 | 1.6 | 106 | 106 | 106 | 106 | 106 | 107 | 107 | 108 | 108 | 108 | 110 | 110 | 110 |
| Acrylic group concentration in components other than dispersion medium (C) (mmol/g) |  |  |  | 9.55 | 6.55 | 5.52 | 9.57 | 8.69 | 8.87 | 8.84 | 8.86 | 7.78 | 9.16 | 9.46 | 9.46 | 9.37 | 9.37 | 9.37 | 9.20 | 9.20 | 9.20 |
| Ratio of tri- or higher multi-functional monomer in components other than dispersion medium (C) (mass %) |  |  |  | 94 | 64 | 54 | 94 | 94 | 85 | 85 | 85 | 75 | 75 | 93 | 93 | 93 | 93 | 93 | 91 | 91 | 91 |
| Oil droplet diameter | $D_{50}(\mu m)$ |  |  | 0.5 | 0.5 | 0.5 | 0.4 | 0.3 | 0.6 | 0.4 | 0.6 | 0.3 | 0.6 | 0.5 | 0.5 | 0.5 | 0.5 | 0.5 | 0.5 | 0.5 | 0.5 |
|  | $D_{90}(\mu m)$ |  |  | 0.7 | 0.7 | 0.7 | 0.6 | 0.5 | 0.8 | 0.6 | 0.8 | 0.4 | 0.8 | 0.7 | 0.7 | 0.7 | 0.7 | 0.7 | 0.7 | 0.7 | 0.7 |
|  | $D_{max}(\mu m)$ |  |  | 1.9 | 1.9 | 1.9 | 1.7 | 1.5 | 2.2 | 1.6 | 2.2 | 1.1 | 3.0 | 1.9 | 1.9 | 1.9 | 1.9 | 1.9 | 1.9 | 1.9 | 1.9 |
| Appearance after application |  |  |  | A | A | A | A | A | A | A | A | A | A | A | A | A | A | A | A | A | A |
| Adhesiveness between substrate and coating film |  |  |  | A | A | B | A | A | A | A | A | A | A | A | A | A | A | A | A | A | A |
| Adhesiveness between laminate and hard coat layer before heating |  |  |  | A | A | B | A | A | A | A | A | A | A | A | A | A | A | A | A | A | A |
| Adhesiveness between laminate and hard coat layer after heating |  |  |  | A | A | B | A | A | A | A | A | A | A | A | A | A | A | A | A | A | A |
| Oligomer blocking properties (ΔHaze) |  |  |  | A | A | B | A | A | A | A | A | A | A | A | A | A | A | A | A | A | AA |
| Coloring-material blocking properties (ΔE * ab value) |  |  |  | A | A | B | A | A | A | A | A | A | A | A | A | A | A | A | A | A | AA |

| | | Acrylic equivalent (g/eq) | Carbodiimide equivalent | Examples (parts by mass) | | | | | | | | | | | | | | | | |
|---|---|---|---|---|---|---|---|---|---|---|---|---|---|---|---|---|---|---|---|---|
| | Molecular weight | | | 19 | 20 | 21 | 22 | 23 | 24 | 25 | 26 | 27 | 28 | 29 | 30 | 31 | 32 | 33 | 34 | 35 |
| Polymerizable compound (A) | | | | | | | | | | | | | | | | | | | | |
| Dipentaerythritol hexaacrylate | 579 | 96 | | 70 | 70 | 70 | 70 | 70 | 70 | 70 | 70 | 70 | | | | | | | | |
| Dipentaerythritol pentaacrylate | 525 | 105 | | 30 | 30 | 30 | 30 | 30 | 30 | 30 | 30 | 30 | | | | | | | | |
| Pentaerythritol triacrylate | 298 | 99 | | | | | | | | | | | | | | | | | | |
| Ethylene oxide-modified hexaacrylate of dipentaerythritol | 1,107 | 185 | | | | | | | | | | | | | | | | | | |
| Polyfunctional urethane acrylate 1 | 760 | 127 | | | | | | | | | | | | | | | | | | |
| Polyfunctional urethane acrylate 2 | 3,270 | 106 | | | | | | | | | | | 100 | | | | | | | |
| Polyfunctional urethane acrylate 3 | 2,860 | 107 | | | | | | | | | | | | 100 | | | | | | |
| Polyfunctional urethane acrylate 4 | 2,940 | 108 | | | | | | | | | | | | | 100 | | | | | |
| Polyfunctional urethane acrylate 5 | 2,690 | 107 | | | | | | | | | | | | | | 100 | | | | |
| Polyfunctional urethane acrylate 6 | 1,238 | 99 | | | | | | | | | | | | | | | 100 | | | |
| Polyfunctional urethane acrylate 7 | 1,241 | 99 | | | | | | | | | | | | | | | | 100 | | |
| Polyfunctional urethane acrylate 8 | 1,210 | 99 | | | | | | | | | | | | | | | | | 100 | |
| Polyfunctional urethane acrylate 9 | 3,518 | 101 | | | | | | | | | | | | | | | | | | 100 |
| Polyethylene glycol diacrylate | 708 | 354 | | | | | | | | | | | | | | | | | | |
| Polypropylene glycol diacrylate | 808 | 404 | | | | | | | | | | | | | | | | | | |
| Polytetramethylene glycol diacrylate | 758 | 379 | | | | | | | | | | | | | | | | | | |
| Bifunctional | 3,500 | 1,750 | | | | | | | | | | | | | | | | | | |

-continued

| | | Molecular weight | Acrylic equivalent (g/eq) | Carbodiimide equivalent | Examples (parts by mass) | | | | | | | | | | | | | | | | |
|---|---|---|---|---|---|---|---|---|---|---|---|---|---|---|---|---|---|---|---|---|---|---|
| | | | | | 19 | 20 | 21 | 22 | 23 | 24 | 25 | 26 | 27 | 28 | 29 | 30 | 31 | 32 | 33 | 34 | 35 |
| | urethane acrylate | | | | | | | | | | | | | | | | | | | | |
| Surfactant (B) | SF1 | | | | 5 | 5 | 5 | 5 | 5 | 5 | 5 | | | | | | | | | | |
| | SF2 | | | | | | | | | | | 5 | | | | | | | | | |
| | SF3 | | | | | | | | | | | | 5 | | | | | | | | |
| | SF4 | | | | | | | | | | | | | 5 | 3 | 3 | 3 | 3 | 3 | 3 | 3 | 3 |
| Inorganic particles (D) | Csi | 5,000 | | | 1 | 1 | 2 | 2 | 2 | 2 | 1 | 1 | 1 | 1 | 1 | 1 | 1 | 1 | 1 | 1 | 1 |
| Polyester (E) | PE1 | | | | | | | | | | | | | | | | | | | | |
| | PE2 | | | | 2 | 1 | 2 | 2 | 2 | 2 | 1 | 1 | 1 | 1 | 1 | 1 | 1 | 1 | 1 | 1 | 1 |
| Crosslinking Agent (F) | Oxazoline group-containing water soluble polymer | | | | | | | | | | | | | | | | | | | | |
| | Methylated melamine resin | | | | | | | | | | | | | | | | | | | | |
| | Carbodiimide compound 1 | | | 590 | | | | | | | | | | | | | | | | | |
| | Carbodiimide compound 2 | | | 430 | | | | | | | | | | | | | | | | | |
| | Carbodiimide compound 3 | | | 335 | | | | | | | | | | | | | | | | | |
| | Carbodiimide compound 4 | | | 445 | | | | | | | | | | | | | | | | | |
| | Carbodiimide compound 5 | | | 365 | | | | | | | | | | | | | | | | | |
| | Carbodiimide compound 6 | | | 310 | | | | | | | | | | | | | | | | | |
| Polymerization Initiator (G) | 1-hydroxycyclohexyl-phenylketone | | | | 3 | | | | | | | | | | | | | | | | |
| | 2-methyl-1-[4-(methylthio)-phenyl]-2-morpholinopropan-1-one | | | | | | | 2 | 2 | 2 | | | | | | | | | | | |
| | 2,2'-azobis(N-butyl-2-methyl-propionamide) | | | | | | 3 | 1 | | | | | | | | | | | | | |
| | α,α'-di(t-butylperoxy)diisopropylbenzene | | | | | | | | 1 | | | | | | | | | | | | |
| | 1,1'-azobis(cyclohexane-1-carbonitrile) | | | | | | | | | 1 | | | | | | | | | | | | |
| | 4,4'-azobis(4-cyanopentanoic acid) | | | | | | | | | | | | | | | | | | | | |
| | 2,2'-azobis[2-methyl-N-(2-hydroxyethyl)propionamide] | | | | | | | | | | | | | | | | | | | | |
| | azobis isobutyronitrile | | | | | | | | | | | | | | | | | | | | |
| Levelling agent | Polyorganosiloxane | | | | | 1 | | | | | | | | | | | | | | | |

-continued

| | | Acrylic equivalent (g/eq) | Carbodiimide equivalent | Examples (parts by mass) | | | | | | | | | | | | | | |
|---|---|---|---|---|---|---|---|---|---|---|---|---|---|---|---|---|---|---|
| | Molecular weight | | | 19 | 20 | 21 | 22 | 23 | 24 | 25 | 26 | 27 | 28 | 29 | 30 | 31 | 32 | 33 | 34 | 35 |
| (H) levelling agent | Fluorine levelling agent | | | | | | | | | | | | | | | | | | | |
| Other components | Acrylic emulsion | | | | | | | | | | | | 0.3 | 0.3 | 0.3 | 0.3 | 0.3 | 0.3 | 0.3 | 0.3 |
| | Polyester emulsion | | | | | | | | | | | | | | | | | | | |
| Total parts by mass | | | | 110 | 107 | 110 | 110 | 110 | 110 | 106 | 106 | 106 | 104 | 104 | 104 | 104 | 104 | 104 | 104 | 104 |
| Acrylic group concentration in components other than dispersion medium (C) (mmol/g) | | | | 9.20 | 9.46 | 9.20 | 9.20 | 9.20 | 9.20 | 9.55 | 9.55 | 9.55 | 9.08 | 8.99 | 8.91 | 8.95 | 9.70 | 9.67 | 9.65 | 9.44 |
| Ratio of tri- or higher multi-functional monomer in components other than dispersion medium (C) (mass %) | | | | 91 | 93 | 91 | 91 | 91 | 91 | 94 | 94 | 94 | 96 | 96 | 96 | 96 | 96 | 96 | 96 | 96 |
| Oil droplet diameter | $D_{50}(\mu m)$ | | | 0.5 | 0.5 | 0.5 | 0.5 | 0.5 | 0.5 | 0.6 | 0.9 | 0.9 | 0.7 | 0.7 | 0.7 | 0.7 | 0.7 | 0.7 | 0.7 | 0.7 |
| | $D_{90}(\mu m)$ | | | 0.7 | 0.7 | 0.7 | 0.7 | 0.7 | 0.7 | 0.9 | 1.6 | 1.6 | 1.2 | 1.2 | 1.2 | 1.2 | 1.2 | 1.2 | 1.2 | 1.2 |
| | $D_{max}(\mu m)$ | | | 1.9 | 1.9 | 1.9 | 1.9 | 1.9 | 1.9 | 2.1 | 3.4 | 3.4 | 2.5 | 2.5 | 2.5 | 2.5 | 2.5 | 2.5 | 2.5 | 2.5 |
| Appearance after application | | | | A | A | A | A | A | A | A | A | A | A | A | A | A | A | A | A | A |
| Adhesiveness between substrate and coating film | | | | A | A | A | A | A | A | A | A | A | A | A | A | A | A | A | A | A |
| Adhesiveness between laminate and hard coat layer before heating | | | | A | A | A | A | A | A | A | A | A | A | A | A | A | A | A | A | A |
| Adhesiveness between laminate and hard coat layer after heating | | | | A | A | A | A | A | A | A | A | A | A | A | A | A | A | A | A | A |
| Oligomer blocking properties | | | | A | A | AA | AA | AA | AA | AA | AA | AA | AAA | AAA | AAA | AAA | AA | AA | AA | AAA |
| Coloring-material blocking properties ($\Delta E^{*}$ ab value) ($\Delta$Haze) | | | | A | A | AA | AA | AA | AA | A | A | A | AAA | AAA | AAA | AAA | AA | AA | AA | AAA |

| | Molecular weight | Acrylic equivalent (g/eq) | Carbodiimide equivalent | Examples (parts by mass) | | | | | | Comparative Examples (parts by mass) | | | | | | | | | |
|---|---|---|---|---|---|---|---|---|---|---|---|---|---|---|---|---|---|---|---|
| | | | | 36 | 37 | 38 | 39 | 40 | 41 | 1 | 2 | 3 | 4 | 5 | 6 | 7 | 8 | 9 | 10 |
| Polymerizable compound (A) | | | | | | | | | | | | | | | | | | | |
| Dipentaerythritol hexaacrylate | 579 | 96 | | | | | | | | 20 | | 20 | | | 70 | 70 | | 70 | 70 |
| Dipentaerythritol pentaacrylate | 525 | 105 | | | | | | | | 10 | | 10 | | | 30 | 20 | | 30 | 30 |
| Pentaerythritol triacrylate | 298 | 99 | | | | | | | | | | | | | | 10 | | | |
| Ethylene oxide-modified hexaacrylate of dipentaerythritol | 1,107 | 185 | | | | | | | | | | | 50 | | | | | | |
| Polyfunctional urethane acrylate 1 | 760 | 127 | | | | | | | | | 10 | | | | | | | | |
| Polyfunctional urethane acrylate 2 | 3,270 | 106 | | | | | | | | | | | | | | | | | |
| Polyfunctional urethane acrylate 3 | 2,860 | 107 | | | | | | | | | | | | | | | | | |
| Polyfunctional urethane acrylate 4 | 2,940 | 108 | | | | | | | | | | | | | | | | | |
| Polyfunctional urethane acrylate 5 | 2,690 | 107 | | | | | | | | | | | | | | | | | |
| Polyfunctional urethane acrylate 6 | 1,238 | 99 | | 100 | 100 | 100 | 100 | 100 | 100 | | | | | | | | | | |
| Polyfunctional urethane acrylate 7 | 1,241 | 99 | | | | | | | | | | | | | | | | | |
| Polyfunctional urethane acrylate 8 | 1,210 | 99 | | | | | | | | | | | | | | | | | |
| Polyfunctional urethane acrylate 9 | 3,518 | 101 | | | | | | | | | | | | | | | | | |
| Polyethylene glycol diacrylate | 708 | 354 | | | | | | | | | 10 | | | | | | | | |
| Polypropylene glycol diacrylate | 808 | 404 | | | | | | | | 70 | | | | | | | | | |
| Polytetramethylene glycol diacrylate | 758 | 379 | | | | | | | | | 80 | | | | | | | | |
| Bifunctional urethane acrylate | 3,500 | 1,750 | | | | | | | | | | | | | | | | | |
| Surfactant (B) | | | | | | | | | | | | | | | | | | | |
| SF1 | | | | 3 | 3 | 3 | 3 | 3 | 3 | 5 | 5 | 5 | 5 | | 5 | 5 | | 5 | 5 |
| SF2 | | | | | | | | | | | | 55 | | | | | | | |
| SF3 | | | | | | | | | | | | | | | | | | | |
| SF4 | | | | | | | | | | | | | | | | | | | |
| Inorganic particles (D) | | | | | | | | | | | | | | | | | | | |
| Csi | | 5,000 | | | | | | | | 50 | | 20 | 10 | | | | | | |
| Polyester (E) | | | | | | | | | | | | | | | | | | | |
| PE1 | | | | | | | | | | | | | | | | | | | |
| PE2 | | | | | | | | | | | | | 50 | | | | | | |
| Crosslinking Agent (F) | | | | | | | | | | | | | | | | | | | |
| Oxazoline group-containing water soluble polymer | | | | | | | | | | 1 | 1 | 1 | | | 1 | 1 | | 1 | 1 |
| Methylated melamine resin | | | | 1 | 1 | | | | | | | | | | | | | | |
| Carbodiimide compound 1 | | | 590 | | 1 | | | | | | | | | | | | | | |
| Carbodiimide compound 2 | | | 430 | | | | | | | | | | | | | | | | |

-continued-

| | Molecular weight | Acrylic equivalent (g/eq) | Carbodiimide equivalent | Examples (parts by mass) | | | | | | Comparative Examples (parts by mass) | | | | | | | | | |
|---|---|---|---|---|---|---|---|---|---|---|---|---|---|---|---|---|---|---|---|
| | | | | 36 | 37 | 38 | 39 | 40 | 41 | 1 | 2 | 3 | 4 | 5 | 6 | 7 | 8 | 9 | 10 |
| Carbodiimide compound 3 | | | 335 | | | | | | | | | | | | | | | | |
| Carbodiimide compound 4 | | | 445 | | | 1 | | | | | | | | | | | | | |
| Carbodiimide compound 5 | | | 365 | | | | 1 | | | | | | | | | | | | |
| Carbodiimide compound 6 | | | 340 | | | | | | 1 | | | | | | | | | | |
| Polymerization Initiator (G) 1-hydroxycyclohexyl-phenylketone | | | | | | | | | | | | | | | | | | | |
| 2-methyl-1-[4-(methylthio)-phenyl]-2-morpholinopropan-1-one | | | | | | | | | | | | | | | | | | | |
| 2,2'-azobis(N-butyl-2-methyl-propionamide) | | | | | | | | | | | | | | | | | | | |
| α,α'-di(t-butylperoxy)diisopropylbenzene | | | | | | | | | | | | | | | | | | | |
| 1,1'-azobis(cyclohexane-1-carbonitrile) | | | | | | | | | | | | | | | | | | | |
| 4,4'-azobis(4-cyanopentanoic acid) | | | | | | | | | | | | | | | | | | | |
| 2,2'-azobis[2-methyl-N-(2-hydroxyethyl)propionamide] | | | | | | | | | | | | | | | | | | | 3 | 3 |
| azobis isobutyronitrile | | | | | | | | | | | | | | | | | | | | |
| Levelling agent Polyorganosiloxane levelling agent (H) | | | | 0.3 | 0.3 | 0.3 | 0.3 | 0.3 | 0.3 | | | | | | | | | | |
| Fluorine levelling agent | | | | | | | | | | | | | | | | | | | |
| Other components Acrylic emulsion | | | | | | | | | | | | | | 100 | | | | | |
| Polyester emulsion | | | | | | | | | | | | | | | | | 100 | | |
| Total parts by mass | | | | 104 | 104 | 104 | 104 | 104 | 104 | 156 | 106 | 111 | 115 | 100 | 106 | 106 | 100 | 109 | 109 |
| Acrylic group concentration in components other than dispersion medium (C) (mmol/g) | | | | 9.70 | 9.70 | 9.70 | 9.70 | 9.70 | 9.70 | 3.11 | 2.77 | 3.04 | 2.37 | 0 | 9.55 | 9.60 | 0 | 9.28 | 9.28 |
| Ratio of tri- or higher multi-functional monomer in components other than dispersion medium (C) (mass %) | | | | 96 | 96 | 96 | 96 | 96 | 96 | 19 | 9 | 27 | 43 | 0 | 94 | 94 | 0 | 92 | 92 |
| Oil droplet diameter | $D_{50}$ (μm) | | | 0.7 | 0.7 | 0.7 | 0.7 | 0.7 | 0.7 | 1.0 | 0.9 | 1.0 | 1.0 | 0.2 | 0.7 | 0.7 | 0.04 | 0.8 | 1.0 |
| | $D_{90}$ (μm) | | | 1.2 | 1.2 | 1.2 | 1.2 | 1.2 | 1.2 | 2.1 | 1.9 | 2.2 | 2.2 | 0.3 | 1.9 | 1.8 | 0.06 | 1.9 | 2.1 |
| | $D_{max}$ (μm) | | | 2.5 | 2.5 | 2.5 | 2.5 | 2.5 | 2.5 | 4.0 | 3.9 | 4.5 | 4.4 | 0.9 | 3.9 | 4.2 | 0.09 | 3.9 | 4.1 |
| Appearance after application | | | | A | A | A | A | A | A | C | C | B | B | A | C | C | A | C | C |
| Adhesiveness between substrate and coating film | | | | A | A | A | A | A | A | A | A | A | B | B | A | A | A | C | A |

-continued

| | Molecular weight | Acrylic equivalent (g/eq) | Carbodiimide equivalent | Examples (parts by mass) | | | | | | Comparative Examples (parts by mass) | | | | | | | | | |
|---|---|---|---|---|---|---|---|---|---|---|---|---|---|---|---|---|---|---|---|
| | | | | 36 | 37 | 38 | 39 | 40 | 41 | 1 | 2 | 3 | 4 | 5 | 6 | 7 | 8 | 9 | 10 |
| Adhesiveness between laminate and hard coat layer before heating | | | | A | A | A | A | A | A | A | A | A | B | A | A | A | A | C | A |
| Adhesiveness between laminate and hard coat layer after heating | | | | A | A | A | A | A | A | C | C | C | C | C | B | B | C | C | B |
| Oligomer blocking properties (ΔHaze) | | | | AA | AA | AA | AA | AA | AAA | B | B | B | B | B | A | A | B | C | A |
| Coloring-material blocking properties (ΔE * ab value) | | | | AA | AA | AA | AA | AA | AAA | B | B | B | B | B | A | A | B | C | A |

As is clear from the results in Tables 1 to 3, the coating films formed from the emulsion compositions of Examples were superior in appearance after application and capable of enhancing the adhesiveness between the substrate and the hard coat layer. Furthermore, the coating films were superior in the oligomer blocking properties as well as the coloring-material blocking properties. In other words, the coating films involved the features required for an easily adhesive layer, i.e., superior appearance after application and easy adhesiveness, and were capable of preventing the bleed-out of the oligomer and the coloring material. Thus, the laminate having the substrate and the coating film formed from the emulsion composition of any one of Examples is considered to provide the appearance and the adhesiveness to the adherend which are unlikely to decrease, due to the coating film inhibiting a relatively low molecular component such as a plasticizer, a coloring material, and an oligomer from being bled out on the coating-film side face. On the other hand, the coating film formed from the emulsion composition of any one of Comparative Examples was inferior in at least one of: appearance after application; and the oligomer blocking properties and the coloring-material blocking properties, as compared to the coating film formed from the emulsion composition of any one of Examples.

INDUSTRIAL APPLICABILITY

According to the emulsion composition of the present invention, the formation of a coating film having superior bleed-out preventing properties is enabled. According to the production method of the emulsion composition of the present invention, the easy and reliable production of the emulsion composition is enabled. The laminate of the present invention provides the appearance unlikely to deteriorate and the adhesiveness to an adherend unlikely to decrease. According to the production method of the laminate of the present invention, the easy and reliable production of the laminate is enabled.

The invention claimed is:
1. An emulsion composition comprising: a polymerizable compound comprising two or more (meth)acryloyl groups; a reactive surfactant; and a dispersion medium comprising water as a principal component,
wherein an oil droplet diameter $D_{90}$ corresponding to a diameter at cumulative 90% by volume in oil droplet size distribution of oil droplets comprising the polymerizable compound and the reactive surfactant, measured according to a laser diffraction and scattering measurement process is less than 1.8 μm, and
wherein the oil droplets comprise, as the reactive surfactant, a compound represented by formula (1):

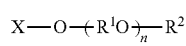
(1)

wherein, in the formula (1), X represents a monovalent group that comprises an aromatic ring, an ethylenic double bond or a combination thereof; le represents an alkylene group having 2 to 4 carbon atoms; n is an integer of 5 to 150, wherein a plurality of $R^1$s are identical or different; $R^2$ represents a hydrogen atom, —PO(OM)$_2$-SO$_3$M or a monovalent ethylenic double bond-containing group, wherein each M independently represents a hydrogen atom, an ammonium group or a metal atom, and at least one of X and $R^2$ represents a group comprising a monovalent ethylenic double bond.

2. The emulsion composition according to claim 1, wherein a maximum oil droplet diameter $D_{max}$ of the oil droplets, measured according to the laser diffraction and scattering measurement process is less than 4.0 μm.

3. The emulsion composition according to claim 1, wherein a content of the polymerizable compound in the emulsion composition with respect to 100 parts by mass of a total of components other than the dispersion medium is no less than 40 parts by mass.

4. The emulsion composition according to claim 1, wherein a content of the reactive surfactant in the emulsion composition with respect to 100 parts by mass of a total of components other than the dispersion medium is no greater than 30 parts by mass.

5. The emulsion composition according to claim 1, wherein the oil droplets further comprise an inorganic particle.

6. The emulsion composition according to claim 1, further comprising a polymerization initiator.

7. The emulsion composition according to claim 6, wherein a 10-hr half-life temperature of the polymerization initiator is greater than 65° C.

8. The emulsion composition according to claim 7, wherein the polymerization initiator is an azo polymerization initiator.

9. The emulsion composition according to claim 1, wherein the emulsion composition is to be applied on at least one face of a resin film that is a substrate-forming material.

10. A laminate comprising:
a substrate; and
a coating film that is overlaid on at least one face of the substrate,
wherein the coating film is formed from the emulsion composition according to claim 1.

11. The laminate according to claim 10, wherein an average thickness of the coating film is no less than 0.01 μm and no greater than 1 μm.

12. The laminate according to claim 10, wherein a principal component of the substrate is polyethylene terephthalate, polybutylene terephthalate, polyethylene naphthalate, polypropylene, an ethylene-vinyl acetate copolymer, polycarbonate, polyamide, polyimide, polyamideimide, polyphenylene ether, polyphenylene sulfide, polyarylate or polysulfone.

13. The laminate according to claim 10, wherein the coating film is used as an easily adhesive layer.

14. A production method of a laminate comprising:
applying the emulsion composition according to claim 1 on at least one face of a substrate or a resin film that is a substrate-forming material; and
heating an applied film obtained by the applying.

15. The production method of a laminate according to claim 14,
wherein the emulsion composition is applied on at least one face of the resin film, and
the production method further comprises stretching the resin film after the applying.

16. A production method of an emulsion composition comprising:
mixing a dispersion medium comprising water as a principal component, a polymerizable compound comprising two or more (meth)acryloyl groups, and a reactive surfactant; and applying a stress to a mixture obtained by the mixing,
wherein an oil droplet diameter $D_{90}$ corresponding to a diameter at cumulative 90% by volume in oil droplet size distribution of oil droplets obtained by the applying, measured according to a laser diffraction and scattering measurement process is less than 1.8 μm, and
wherein the oil droplets comprise, as the reactive surfactant, a compound represented by formula (1):

(1)

wherein, in the formula (1), X represents a monovalent group that comprises an aromatic ring, an ethylenic double bond or a combination thereof; le represents an alkylene group having 2 to 4 carbon atoms; n is an integer of 5 to 150, wherein a plurality of $R^1$s are identical or different; $R^2$ represents a hydrogen atom, —$PO(OM)_2$-$SO_3M$ or a monovalent ethylenic double bond-containing group, wherein each M independently represents a hydrogen atom, an ammonium group or a metal atom, and at least one of X and $R^2$ represents a group comprising a monovalent ethylenic double bond.

* * * * *